United States Patent
Goebel et al.

(10) Patent No.: US 11,259,126 B1
(45) Date of Patent: Feb. 22, 2022

(54) PROPERTY CONTROL AND CONFIGURATION BASED ON DOOR KNOCK DETECTION

(71) Applicant: Alarm.com Incorporated, Tysons, VA (US)

(72) Inventors: Eric Goebel, Pompano Beach, FL (US); Robert Fennell, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/863,617

(22) Filed: Apr. 30, 2020

Related U.S. Application Data

(60) Provisional application No. 62/844,820, filed on May 8, 2019.

(51) Int. Cl.
*H04R 19/04* (2006.01)
*G08B 13/16* (2006.01)
*H04N 7/18* (2006.01)

(52) U.S. Cl.
CPC ......... *H04R 19/04* (2013.01); *G08B 13/1672* (2013.01); *H04N 7/186* (2013.01)

(58) Field of Classification Search
USPC .............. 348/14.01, 143, 211.8, 211.13, 114
See application file for complete search history.

(56) References Cited

U.S. PATENT DOCUMENTS

| | | | |
|---|---|---|---|
| 7,971,156 B2 | 6/2011 | Albertson et al. | |
| 9,159,217 B1 | 10/2015 | Logan et al. | |
| 9,447,609 B2 | 9/2016 | Johnson et al. | |
| 9,691,198 B2 | 6/2017 | Cheng et al. | |
| 10,184,272 B2 | 1/2019 | Lee | |
| 10,635,907 B2 * | 4/2020 | Child | G07C 9/30 |
| 2019/0130687 A1 | 5/2019 | Johnson | |

* cited by examiner

*Primary Examiner* — Yosef K Laekemariam
(74) *Attorney, Agent, or Firm* — Fish & Richardson P.C.

(57) ABSTRACT

A monitoring system that is configured to monitor a property is disclosed. The monitoring system includes a microphone that is configured to detect sound within an area near a door of the property and generate audio data that represents the sound. The monitoring system includes a monitor control unit configured to obtain the audio data generated by the microphone; evaluate one or more characteristics of the audio data; based on evaluating the one or more characteristics of the audio data, determine that the audio data corresponds to a knock event at the door; and in response to determining that the audio data corresponds to a knock event at the door, perform a monitoring system action. The one or more characteristics of the audio data include one or more of a duration, a peak frequency, an amplitude, or a period.

34 Claims, 7 Drawing Sheets

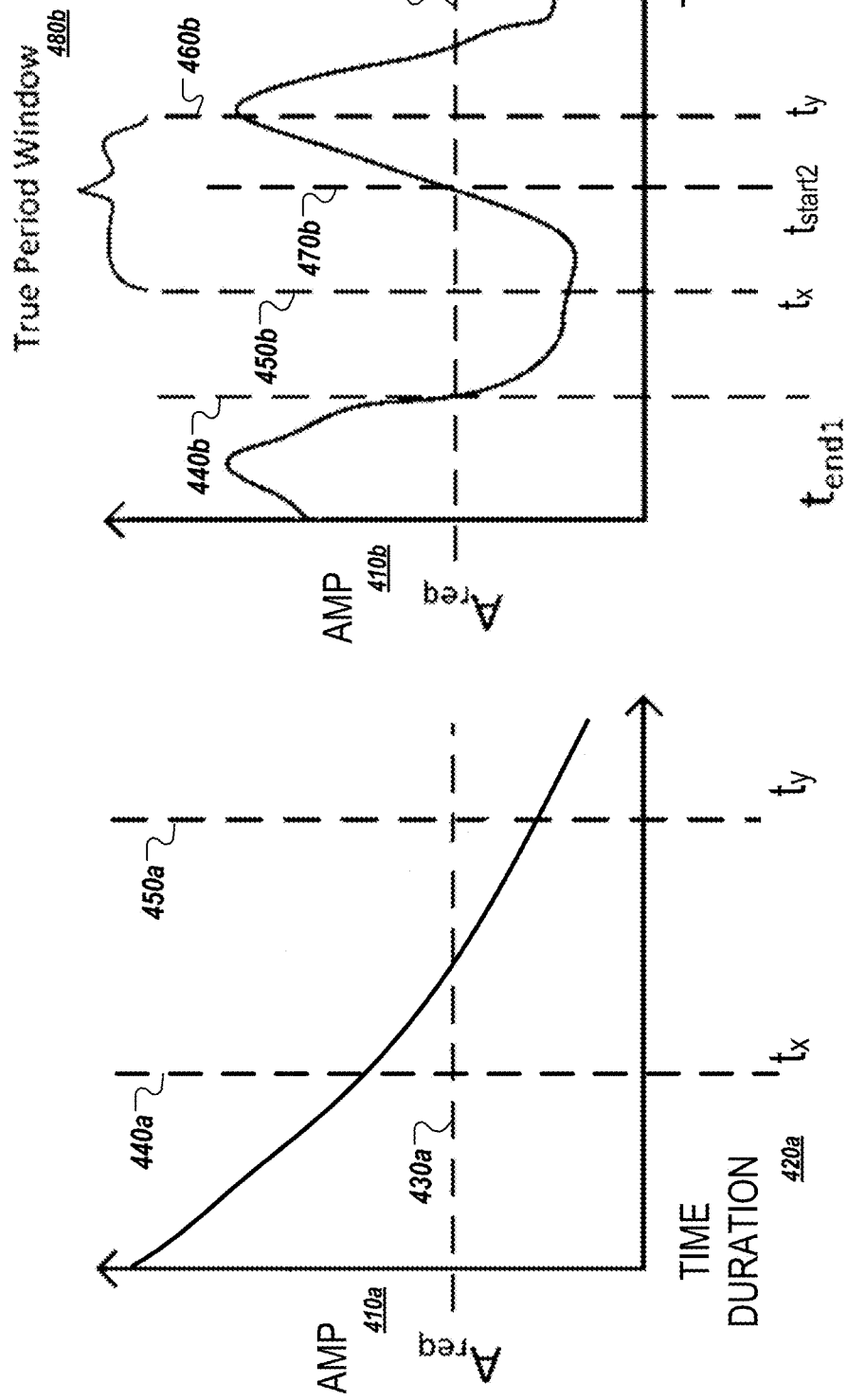

… (1)

PROPERTY CONTROL AND CONFIGURATION BASED ON DOOR KNOCK DETECTION

CROSS-REFERENCE TO RELATED APPLICATION

This application claims the benefit of U.S. Application No. 62/844,820, filed May 8, 2019, which is incorporated by reference in its entirety.

BACKGROUND

Many properties are equipped with monitoring systems that include sensors and connected system components.

SUMMARY

Many residents and homeowners equip their properties with monitoring systems to enhance the security, safety, or convenience of their properties. The property monitoring systems can include door knock detectors, which can detect the event of someone knocking on a door to a property.

A door knock detector can detect a person knocking on the door of a property based on the audio properties of the sound produced by the knock. A door knock detector can be integrated into a smart doorbell, or can be a separate microphone device. Additional microphones can be installed near a door to improve directionality and accuracy. A door knock detector can trigger a monitoring system to notify a resident if someone is knocking on a door of a property.

Many property monitoring systems include smart doorbells. These smart doorbells can connect to the internet and provide residents with a notification when someone presses the doorbell. Many smart doorbells also include motion sensors to detect when a person approaches the doorbell.

One example of a motion sensor typically found in smart doorbells is passive infrared (PIR) sensor. PIR sensors can detect moving heat signatures. If a moving heat signature is detected, the smart doorbell can initiate a predetermined process such as sending a notification to the resident. PIR sensors can be used in low-power operations. PIR sensors can be linked to a surveillance camera so that if a PIR sensor detects motion, the surveillance camera begins to record.

Another example of a motion sensor typically found in smart doorbells is video motion detection. Video motion detection analyzes surveillance camera footage to detect for motion. Video motion detection requires more power than PIR sensors. Video motion detection also requires the surveillance camera to continuously record.

The integration of motion sensors into smart doorbells can cause false alarms. For example, motion sensors may pick up the motion of vehicles, passersby, animals, flags, and tree branches. In some cases, residents may receive notifications or alerts every time the motion sensor detects motion. The notifications may be sent, for example, to residents' mobile devices or to a control panel of the monitoring system. Due to the false alarms, many residents of properties that have smart doorbells turn their motion sensor notifications off.

If notifications from a smart doorbell motion sensor are turned off, the resident will only receive a doorbell notification if the button on the doorbell is pressed. However, not everyone who approaches the door of a property presses the doorbell button. For example, a person may choose not to press a doorbell button if he or she does not want to wake a resident who may be sleeping. Additionally, a person may not want to startle pets on the property by ringing a doorbell. In these cases, a person approaching a door may knock on the door instead of pressing the doorbell button.

A door knock detector can detect a person knocking on the door of a property based on the audio properties of the sound produced by the knock, and can trigger a monitoring system to notify a resident if someone is knocking on a door of a property.

In some implementations, monitoring systems can dynamically control and configure devices and components of a property based on the detection of a door knock. For example, the monitoring system can use the data provided by a knock detector to activate a doorbell chime, activate a surveillance camera, or turn on a porch light.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A and 4B are graphs showing time duration and pulse periodicity for example knock events.

Like reference numbers and designations in the various drawings indicate like elements.

DETAILED DESCRIPTION

Figure 1:
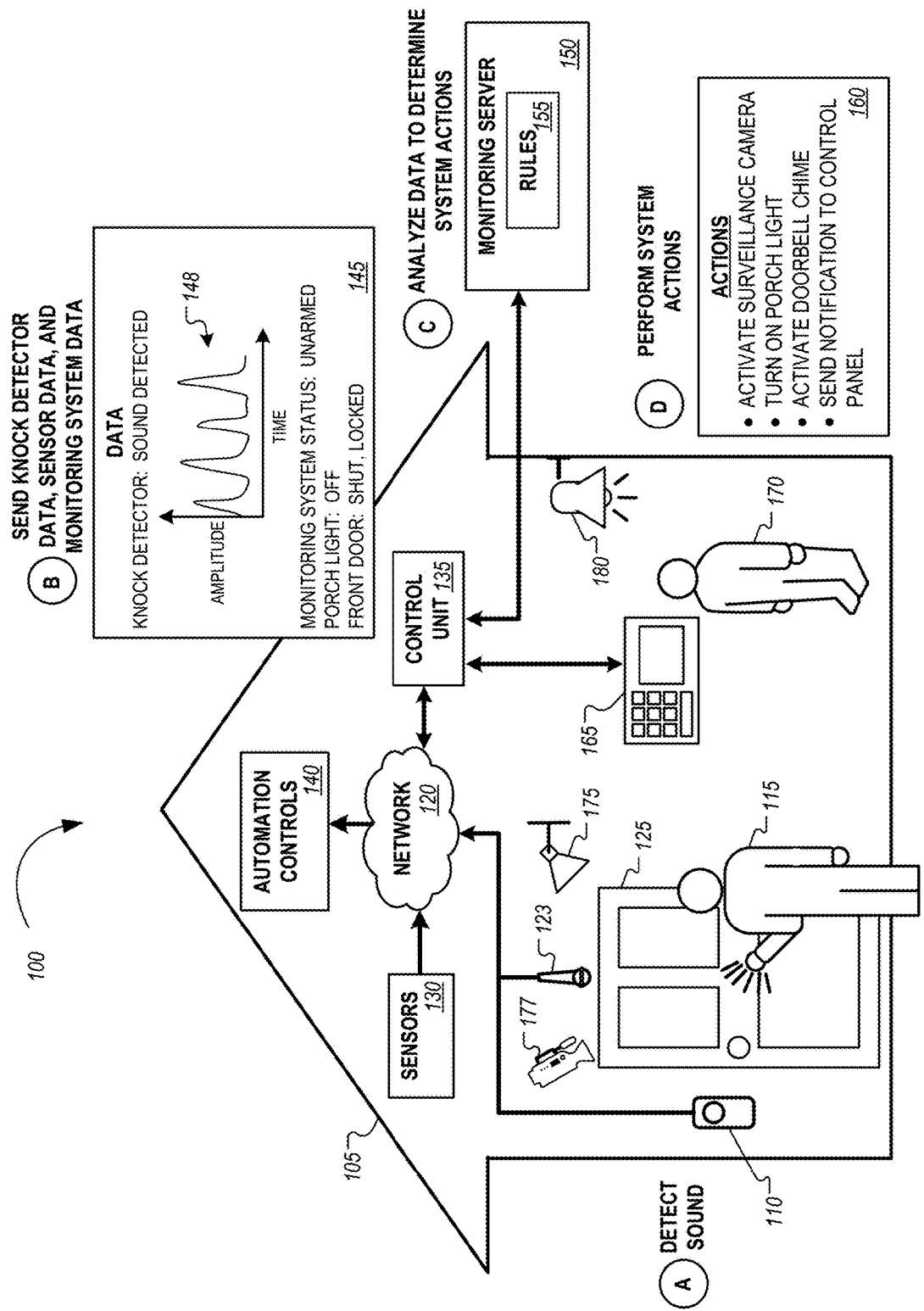
FIG. 1 is a diagram illustrating an example system for residential property control and configuration based on door knock detection.

FIG. 1 is a diagram illustrating an example of a system 100 for property control and configuration based on door knock detection.

A property 105 is monitored by a property monitoring system. The property 105 can be a home, another residence, a place of business, a public space, or another facility that has a knock detector 110 installed and is monitored by a property monitoring system. The property monitoring system includes one or more sensors 130 located at the property 105 that collect sensor data related to the property 105. The property monitoring system also has the ability to communicate with and control various devices on the property 105 through automation controls 140.

In the example of FIG. 1, a visitor 115 approaches a door 125 of the property 105. The visitor 115 does not ring the doorbell. The visitor 115 knocks four times on the door 125. Each of the four individual knocks on the door 125 produces a sound pulse. The four knocks combined can be considered a knock event.

In stage (A) of FIG. 1, a microphone of the knock detector 110 detects four sound pulses. The knock detector 110 can be integrated into a doorbell, or can be a separate sensor. Additional microphones, e.g., the microphone 123 can be installed near the door 125 to improve knock detection accuracy. In some implementations, the microphone of the knock detector 110, and additional microphones 123, can be programmed to continuously monitor for sounds. In some implementations, the microphone of the knock detector 110, and the microphone 123, can be programmed to monitor for sounds when activated by the monitoring system. For example, the monitoring system can activate the knock detector 110 and the microphone 123 when a motion sensor or a surveillance camera 177 connected to the monitoring system senses motion.

The knock detector 110 and the microphone 123 send audio data 148 to the control unit 135 through the network 120.

Other sensors 130 of the monitoring system collect various sensor data from the property 105. For example, the sensors 130 can include light sensors, surveillance cameras 177, microphones, and door and window lock sensors. The sensors 130 send the sensor data to the control unit 135 through the network 120.

The control unit 135 receives the audio data 148 from the knock detector 110, and the sensor data from the sensors 130. The control unit 135 can be, for example, a computer system or other electronic device configured to communicate with the knock detector 110 and sensors 130. The control unit 135 can also perform various management tasks and functions for the monitoring system. In some implementations, the resident 170, or another user, can communicate with the control unit 135 (e.g., input data, view settings, or adjust parameters) through a physical connection, such as a touch screen or keypad, through a voice interface, or over a network connection.

The knock detector 110 and sensors 130 may communicate with the control unit 135 through a network 120. The network 120 can be any communication infrastructure that supports the electronic exchange of data between the control unit 135, the knock detector 110, and sensors 130. For example, the network 120 may include a local area network (LAN). The network 120 may be any one or combination of wireless or wired networks and may include any one or more of Ethernet, Bluetooth, Bluetooth LE, Z-wave, Zigbee, or Wi-Fi technologies.

In stage (B) of FIG. 1, the control unit 135 sends the various data 145 to a remote monitoring server 150, where the data 145 can include the audio data 148 from the knock detector 110, and sensor data from the sensors 130. The control unit 135 also sends the status of the property monitoring system to the monitoring server 150. For example, the monitoring system may have settings of "unarmed," "armed, stay," and "armed, away."

The monitoring server 150 may be, for example, one or more computer systems, server systems, or other computing devices that are located remotely from the property 105 and that are configured to process information related to the monitoring system at the property 105. In some implementations, the monitoring server 150 is a cloud computing platform.

The control unit 135 communicates with the monitoring server 150 via a long-range data link. The long-range data link can include any combination of wired and wireless data networks. For example, the control unit 135 can exchange information with the monitoring server 150 through a wide-area-network (WAN), a broadband internet connection, a cellular telephony network, a wireless data network, a cable connection, a digital subscriber line (DSL), a satellite connection, or other electronic means for data transmission. The control unit 135 and the monitoring server 150 may exchange information using any one or more of various communication synchronous or asynchronous protocols, including the 802.11 family of protocols, TCP/IP, GSM, 3G, 4G, 5G, LTE, CDMA-based data exchange or other techniques. In some implementations, the long-range data link between the control unit 135 and the monitoring server 150 is a secure data link (e.g., a virtual private network) such that the data exchanged between the control unit 135 and the server 150 is encoded to protect against interception by an adverse third party.

In some implementations, various other monitoring system components located at the property 105 communicate directly with the monitoring server 150 (e.g., sending data directly to the monitoring server 150 rather than sending data to the server 150 via the control unit 135). For example, the knock detector 110, the sensors 130, the automation controls 140, or other devices at the property 105 can provide some or all of the data 145 to the monitoring server 150, e.g., through an internet connection.

In some implementations, the control unit 135 processes some or all of the data 145 before sending the data 145 to the monitoring server 150. For example, the control unit 135 may compress or encode the data 145 to reduce the bandwidth required to support data transmission. The control unit 135 can also aggregate, filter, transform, or otherwise process some or all of the data 145.

In the example of FIG. 1, the data 145 includes knock detector 110 data. The data 145 collected from the knock detector 110 includes the audio data 148 from the detected sound. The audio data 148 includes four pulses, representing four sequential rapid increases and decreases in amplitude. The four pulses are approximately evenly spaced in time. In this example, the four pulses in the audio data 148 represent four sequential knocks on the door 125.

The data 145 can also include data from sensors 130 at the property, such as light sensor data, surveillance camera 177 footage, and door and window lock sensor data. For example, the data 145 can include light sensor data indicating that the front porch light is off, and door lock data indicating that the front door is locked. The data 145 can also include the monitoring system status, indicating that the monitoring system is unarmed.

In stage (C), the monitoring server 150 analyzes the data 145 received from the control unit 135. For example, the monitoring server 150 analyzes the audio data 148 from the knock detector 110 to determine if the audio data 148 represents a door knock.

Rules 155 can establish the type of event that is considered a knock event. For example, a knock event can be defined by certain parameters. Example parameters include sound amplitude, peak frequency, time duration, pulse periodicity, and directionality.

The monitoring server 150 can also use a machine learning process to analyze the data 145. When using machine learning, the monitoring server 150 is trained with audio data 148 that corresponds to knock events, and audio data 148 that does not correspond to knock events. The accuracy of the model for determining knock events improves over time as additional data is collected.

The monitoring server 150 can use a rules-based system to determine system actions 160. The rules 155 of the rules-based system can be default rules, set in advance by a system administrator. The rules 155 can also be custom rules, set or modified by the resident 170 or another authorized user of the monitoring system. The rules 155 may be general, such that they are applied to more than one property, or they may be specific to the particular property 105. In some implementations, the rules 155 can be customized according to a particular time of day or other factors.

In some implementations, the rules 155 can be programmed into the control unit 135 in addition to, or instead of, the monitoring server 150. In some implementations, rules 155 can be programmed into the knock detector 110 or another local component of the monitoring system. The control unit 135, knock detector 110, or other local component can analyze the data 145 and determine actions 160 based on the rules 155.

Rules may determine the actions that the monitoring system should take when there is a knock event. An example rule 155 may state that between the hours of 8:00 am and 8:00 pm, the monitoring system activates the doorbell chime 180 when there is a knock event. Another rule may state that between sunset and sunrise, the monitoring system turns on the porch light 175 when there is a knock event. A third rule may be that the monitoring system always activates the surveillance camera 177 when there is a knock event.

The resident 170 can set rules regarding how and when the system sends notifications. For example, a rule 155 may state that the monitoring system always sends a notification to the control panel 165 when there is a knock event. Another rule 155 may state that after 9:00 pm, the monitoring only sends an alert to the resident's mobile device if there are two knock events within a five minute period.

In some implementations, the resident 170 can customize the one or more rules 155 according to his or her preferences. In some implementations, the resident 170 can set the one or more rules 155 through a software application executing on a mobile device, through a graphical interface provided by a browser or application on a computing device, and/or through interacting with a physical interface of the control panel 165 of the property monitoring system.

The rules 155 may vary depending on the monitoring system status. For example, a rule 155 may be that when the monitoring system status is "armed, stay," and the knock detector 110 detects a knock event, the monitoring system sends a notification to the control panel 165, activates the surveillance camera 177, and turns on the porch light 175, but does not activate the doorbell chime 180. Another example rule 155 may be that when the monitoring system status is "unarmed," and the knock detector 110 detects a knock event, the monitoring system locks the door 125 and activates the doorbell chime 180.

The monitoring server 150 can determine any of various actions 160 in response to analyzing the data 145. For example, the monitoring server 150 may determine actions 160 that include sending a notification to a mobile device, sending an instruction to the automation controls 140 to adjust a setting at the property 105, sending a command to a sensor 130 to collect and send additional sensor data, sounding an alarm of the property 105, or sending an alert to a third-party, such as security personnel or emergency services.

In the example of FIG. 1, the monitoring server 150 evaluates the data 145 and determines that there is a knock event. Based on the rules 155, the monitoring server 150 determines the actions 160 of activating the surveillance camera 177, turning on the porch light 175, activating the doorbell chime 180, and sending a notification to the control panel 165.

In stage (D), the server 150 performs the system actions 160. For example, the server 150 can perform the actions 160 by sending a command to a device of the monitoring system through a signal to the control unit 135 over the long-range data link.

In the example of FIG. 1, the monitoring server 150 performs the action 160 of sending a notification to the control panel 165. The notification informs the resident that a visitor 115 is knocking on the door 125. When the resident 170 receives the notification, the resident 170 can then choose to answer the door, lock or unlock the door, and/or communicate with the visitor 115 through the control panel 165.

In some implementations, the monitoring system actions 160 can activate additional sensors 130, possibly through the network 120. The sensors 130 can include a surveillance camera 177 installed near the door 125. To save power and data storage, the surveillance camera 177 may remain off most of the time. The monitoring system can activate the surveillance camera 177 when triggered by an event, such as a door knock.

The monitoring system actions 160 can include adjusting one or more sensors 130. The monitoring server 150 can determine to adjust parameters and criteria of the door knock detector 110 and other sensors 130 based on analyzing the data 145. For example, there may be certain times of day and certain seasons when the knock detector 110 detects sounds of birds chirping. The monitoring server 150 can determine, using machine learning and/or from user feedback, that the sounds of birds chirping are causing false alarms for door knock events. The monitoring server 150 can adjust the door knock detector 110 parameters by, for example, reducing the bandwidth of peak frequencies that are processed as potential knock events. By adjusting the parameters of the door knock detector 110, the monitoring server 150 can reduce the number of false alarm events cause by the sounds of birds chirping.

The control unit 135 can activate one or more property automation controls 140, possibly through the network 120. The property automation controls 140 connect to one or more devices of the property 105 and enable control of various property actions. For example, the property automation controls 140 can turn on or off porch lights 175, lock or unlock the door 125, and activate a doorbell chime 180.

Though described above as being performed by a particular component of system 100 (e.g., the control unit 135 or the monitoring server 150), any of the various control, processing, and analysis operations can be performed by either the control unit 135, the monitoring server 150, or another computer system of the system 100. For example, the control unit 135, the monitoring server 150, or another computer system can analyze the data from the knock detector 110 and sensors 130 to determine the actions 160. Similarly, the control unit 135, the monitoring server 150, or another computer system can control the various sensors 130, the knock detector 110, and/or the property automation controls 140 to collect data or control device operation.

Figure 2:
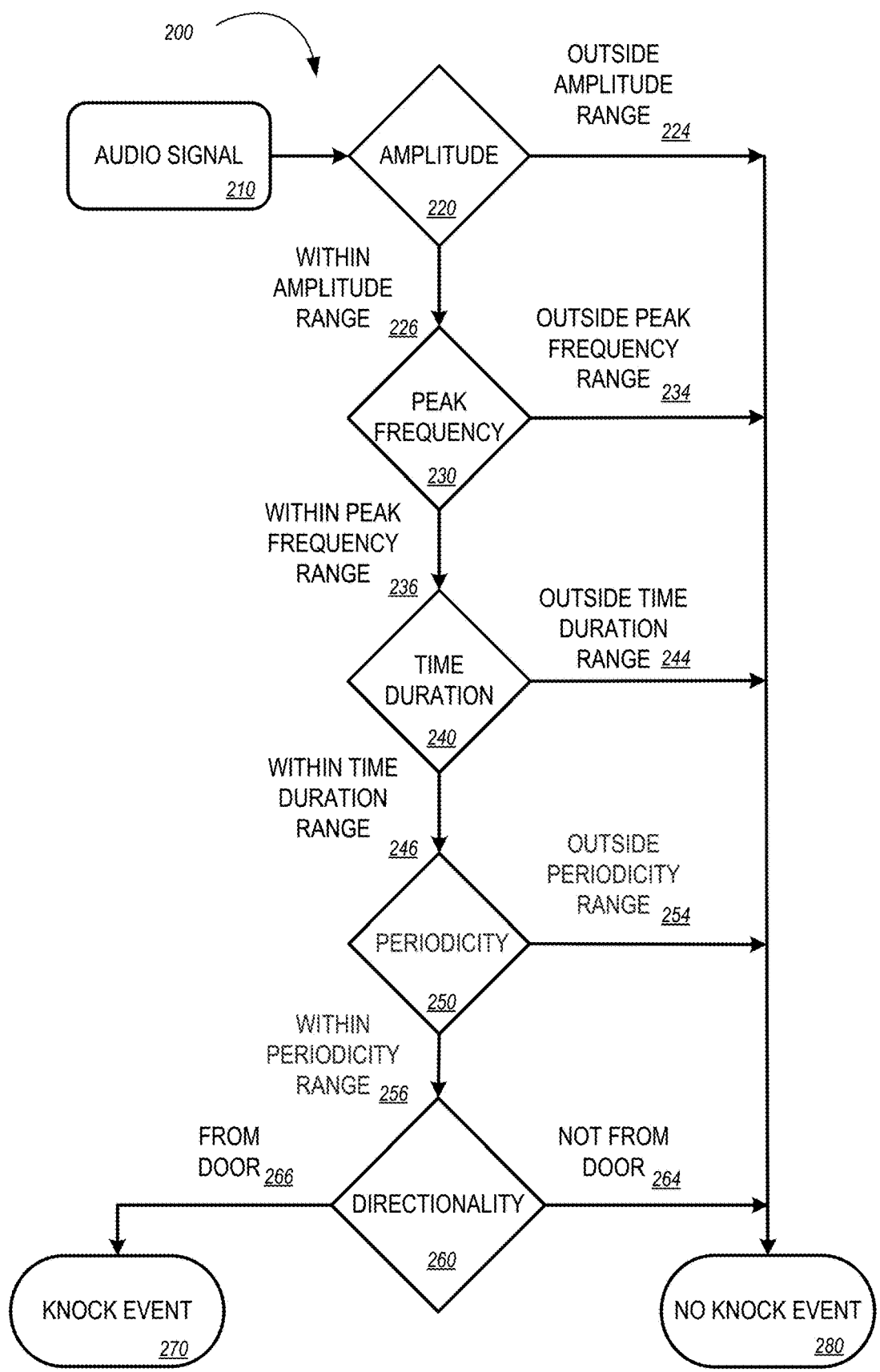
FIG. 2 is a flow chart illustrating an example method for detecting a knock event.

FIG. 2 is a flow chart illustrating an example process 200 for detecting a knock event. The process 200 is performed by a component of the property monitoring system. For example, the process 200 can be performed by the knock detector 110, the control unit 135, the monitoring server 150, or another computer system.

In the first step of process 200, the microphone of knock detector 110 receives sound energy and converts the sound energy to an audio signal 210. The microphone 123 located near the door may also receive the sound energy and produce an audio signal.

In the example process 200, the first parameter evaluated is the amplitude 220 of the audio signal. The monitoring system compares the measured amplitude 220 of the audio signal to a pre-programmed range of amplitudes that corresponds to the sound of a knock. If the amplitude of the audio signal is within a specified amplitude range 226, the monitoring system continues to evaluate the audio signal. If the amplitude of the audio signal is outside of the specified amplitude range 224, the monitoring system determines that the source of the sound energy is not a knock event 280.

The second parameter is the peak frequency 230 of the audio signal, which can be the frequency of maximum amplitude as measured using frequency domain signal analysis. The monitoring system compares the peak frequency 230 of the audio signal to a pre-programmed range of frequencies that corresponds to the sound of a knock. If the peak frequency 230 is within a specified frequency range 236, the monitoring system continues to evaluate the audio signal. If the peak frequency 230 is outside of the specified frequency range 234, the monitoring system determines that the source of the sound energy is not a knock event 280.

The third parameter is the time duration 240 of each sound energy pulse. For example, if a person knocks four times on a door, the knock detector 110 detects four pulses of sound energy. The monitoring system compares the time duration 240 of each pulse to a pre-programmed range of time durations 240 that corresponds to the sound of a knock. If each time duration 240 is within a specified time duration range 246, the monitoring system continues to evaluate the sound. If the time duration 240 is outside of the specified time duration range 244, the monitoring system determines that the sound is not a knock event 280.

The fourth parameter is the pulse periodicity 250, which is the time between pulses detected within a specified time period. When a person knocks on a door, he or she typically knocks more than one time. Because of this, a typical knock event includes two or more pulses within a few seconds. There is a limit to the speed at which a human can deliver a second knock after a first knock. Therefore, if the pulses are too close together in time, the sound is not a potential knock event. There is also a limit to how long a person typically waits before delivering a second knock. Therefore, if the pulses are too far apart in time, the sound is not a potential knock event. If the pulse periodicity 250 is within a pre-programmed periodicity range, the monitoring system continues to evaluate the sound. If the pulse periodicity 250 is outside of the pre-programmed periodicity range, the monitoring system determines that the sound is not a knock event 280.

The fifth parameter is the directionality 260 of the sound energy. To determine directionality 260, the monitoring system can include the microphone 123 in addition to the knock detector 110. A system including two or more microphones can determine the direction of sound energy based on the time delay between sound detection events for each microphone. If the sound energy comes from the direction of the door 266, and all other evaluated parameters are met, the monitoring system determines that the sound is a knock event 270. If the sound does not come from the direction of the door 264, the monitoring system determines that the sound is not a knock event 280.

The process 200 can be adjusted to remove one or more parameters. For example, if no additional microphones are installed, the knock detector 110 can evaluate the sound based only on the four parameters of amplitude 220, peak frequency 230, time duration 240, and pulse periodicity 250. The process 200 can also be adjusted to evaluate the parameters in various sequences. For example, the monitoring server may evaluate time duration 240 before evaluating peak frequency 230.

Figure 3B:
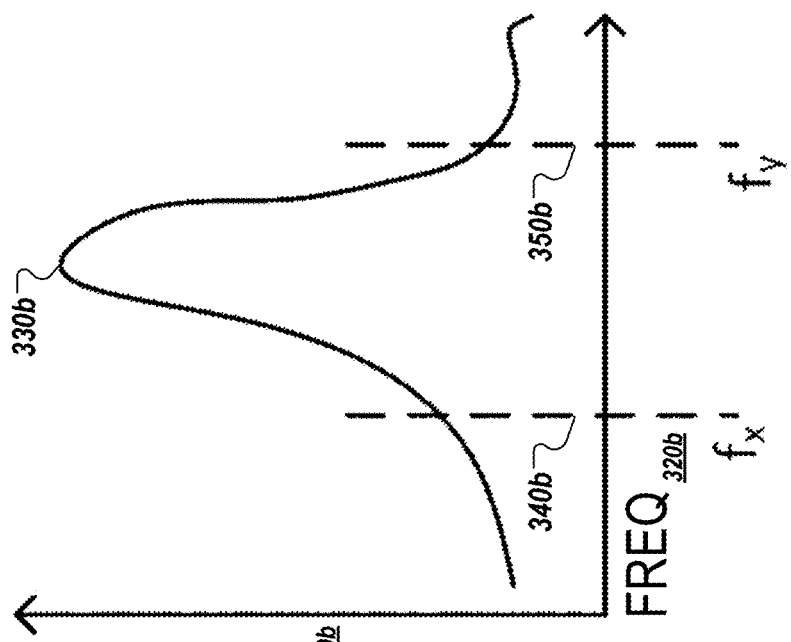
FIGS. 3A and 3B are graphs showing amplitude and peak frequency ranges for example knock events.
Figure 3A:
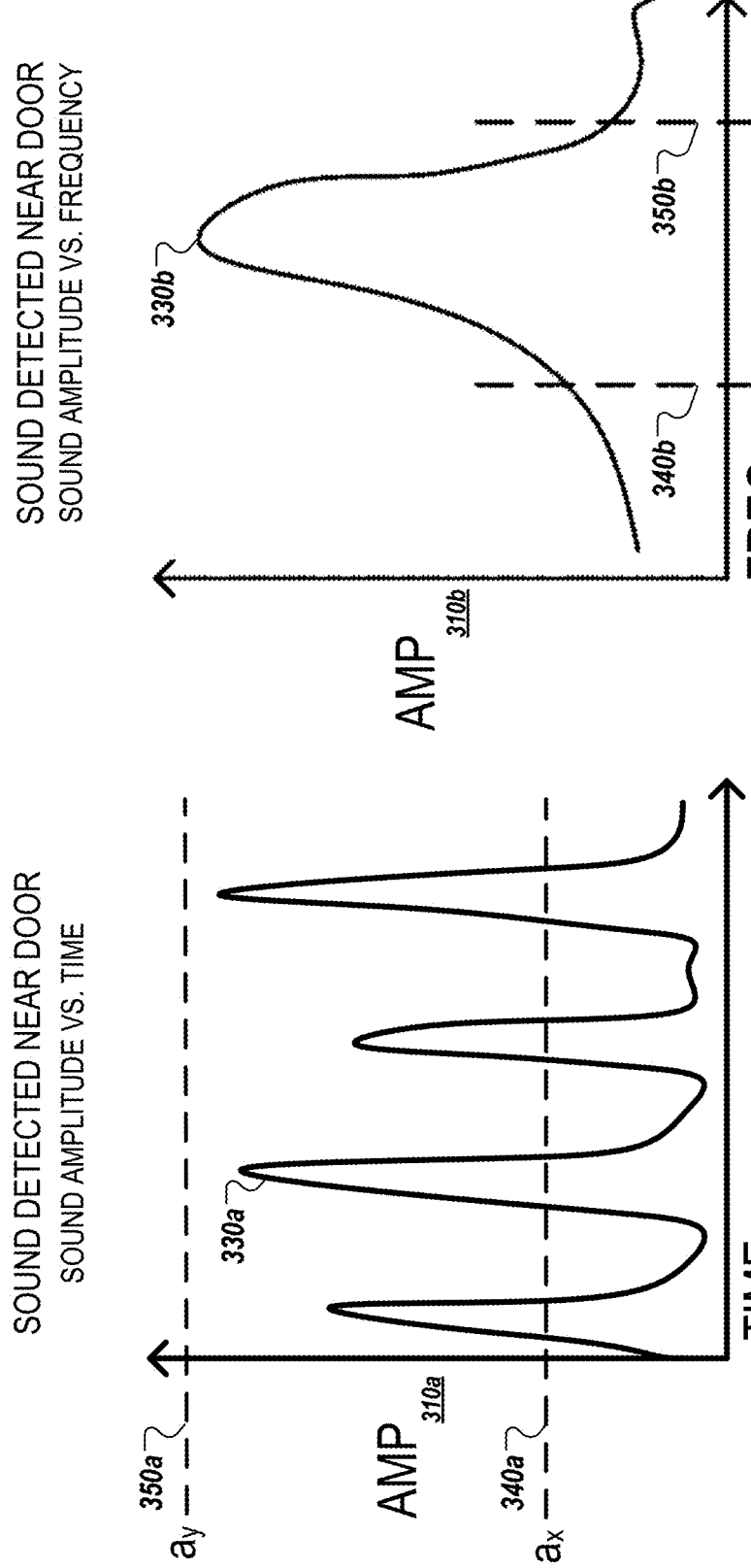

FIGS. 3A and 3B are graphs showing amplitude and peak frequency, respectively, for knock events. The amplitude 310*a*, 310*b* parameter shown on the y-axes of FIG. 3A and FIG. 3B can also be sound volume, intensity, pressure level, or loudness. The amplitude 310*a*, 310*b* can be measured in units such as decibels (dB), microPascals (µPa), phons, and sones. The time 320*a* parameter on the x-axis of FIG. 3A can be measured in units such as seconds or milliseconds. The frequency 320*b* parameter shown on the x-axis of FIG. 3B is the number of cycles per second, or Hertz (Hz), of the detected sound wave.

In FIG. 3A, the measured amplitude 310*a* of the sound is graphed over time 320*a*. The audio signal in FIG. 3A includes four pulses 330*a*. The monitoring system compares the amplitude 310*a* of each pulse 330*a* to a pre-programmed range of amplitudes 310*a* that correspond to the sound of a knock. If the pulses 330*a* register above a minimum amplitude $a_x$ 340*a*, and below a maximum amplitude $a_y$ 350*a*, the system continues the knock verification process.

The amplitude range between $a_x$ 340*a* and $a_y$ 350*a* can be a fixed range, or can be calibrated for a particular door. The amplitude of a door knock can vary depending on the door material, door thickness, force applied, and the distance between the door and the knock detector. In an uncalibrated knock detector, the programmed amplitude range between $a_x$ 340*a* and $a_y$ 350*a* is large enough to apply to many types of door materials and sizes.

For increased accuracy, the installer can calibrate the knock detector to the particular door. For example, to calibrate the knock detector, the installer can knock multiple times on the door with various amounts of force, at various points on the door. The knock detector can then adjust the pre-programmed amplitude range to accommodate the amplitudes from the example knock pulses.

The monitoring system can also use a machine learning process to identify amplitudes that correspond to door knock sounds. The monitoring system can be trained with amplitude data for knock events, and amplitude data for other sounds. Over time, as additional data is collected, the monitoring system can improve its accuracy in differentiating the amplitudes of various sounds.

In FIG. 3A, the four pulses 330*a* each have an amplitude that is greater than $a_x$ 340*a* and less than $a_y$ 350*a*. Therefore, the sound can be considered a potential knock event, and the monitoring system can continue to evaluate other parameters of the sound.

Referring to FIG. 1, the monitoring server 150 can be programmed with rules 155 that determine how many pulses 330*a* are required to fall within the amplitude range in order for the sound to be considered a potential knock event. For example, a rule 155 may state that 50% or more of all pulses 330*a* detected within a given period of time 320*a* must be within the amplitude range. Another example rule 155 may state that if at least one pulse 330*a* is within the amplitude range, the sound is a potential knock event.

By filtering for sound amplitude, the knock detector can reduce false alarms and improve detection accuracy. Sounds that have an amplitude below $a_x$ 340*a* are not processed as potential knock events. For example, the sound of a flag flapping in the wind, or a tree branch creaking, may be eliminated because of their low amplitudes. Likewise, sounds that have an amplitude above $a_y$ 350*a* are not processed as potential knock events. For example, the sound of a police siren may be eliminated because of its high amplitude.

In FIG. 3B, the measured amplitude 310*b* of the sound is graphed over frequency 320*b*. When the knock detector detects a sound, such as a door knock, the sound includes a spectrum of frequencies 320b at various amplitudes 310b. The knock detector determines the peak frequency 330b of the audio signal, which is the frequency of maximum amplitude 310b as measured using frequency domain signal analysis. The monitoring system compares the peak frequency 330b to a pre-programmed range of frequencies that corresponds to the sound of a knock. If the peak frequency 330b registers above a minimum frequency $f_x$ 340b, and below a maximum frequency $f_y$ 350b, the system continues the knock verification process.

The frequency range between $f_x$ 340b and $f_y$ 350b can be a fixed range, or can be calibrated for a particular door. The peak frequency of a door knock can vary depending on the door material, door thickness, and force applied. In an uncalibrated device, the programmed frequency range between $f_x$ 340b and $f_y$ 350a is large enough to apply to many types of door materials and sizes.

For increased accuracy, the installer can calibrate the knock detector to the particular door. To calibrate the knock detector, the installer can knock multiple times on the door with various amounts of force, at various points on the door. The knock detector can then adjust the pre-programmed frequency range to accommodate the peak frequencies from the example knock sounds.

The monitoring system can also use a machine learning process to identify peak frequencies that correspond to door knock sounds. The monitoring system can be trained with peak frequency data for knock events, and peak frequency data for other sounds. Over time, as additional data is collected, the monitoring system can improve its accuracy in differentiating the peak frequencies of various sounds.

In FIG. 3B, the peak frequency 330b is in between $f_x$ 340b and $f_y$ 350a, with other frequencies detected at lower amplitudes. Therefore, the sound can be considered a potential knock event, and the monitoring system continues to evaluate other parameters of the sound.

Referring to FIG. 1, the monitoring server 150 can be programmed with rules 155 that determine the portion of the detected sound that is required to fall within the frequency range in order for the sound to be considered a potential knock event. For example, a rule 155 may state that 50% or more of all detected sound within a given period of time must be within the frequency range. Another example rule 155 may state that if the peak frequency 330b is within the frequency range, the sound is a potential knock event.

By filtering for peak frequency, the knock detector 110 can reduce false alarms and improve detection accuracy. Sounds that have a peak frequency below $f_x$ 340b are not processed as potential knock events. For example, the sound of thunder may be eliminated because of its low frequencies. Likewise, sounds that have a peak frequency above $f_y$ 350a are not processed as potential knock events. For example, the sound of wind chimes may be eliminated because of their high frequencies.

FIGS. 4A and 4B are graphs showing the time duration and pulse periodicity, respectively, for knock events.

FIG. 4A shows the tail end of a sound pulse. The measured amplitude 410a of the sound is graphed over time 420a. The monitoring system compares the duration of the sound pulse to a pre-programmed range of time durations that corresponds to the sound of a knock. If the amplitude 410a of the sound falls below a required amplitude $A_{req}$ 430a after time $t_x$ 440a but before time $t_y$ 450a, the system continues the knock verification process.

The time duration range between $t_x$ 440a and $t_y$ 450a can be a fixed value, or can be calibrated for a particular door. The duration of a door knock can vary depending on the door material, door thickness, and force applied. In an uncalibrated device, the programmed time duration range between $t_x$ 440a and $t_y$ 450a is large enough to apply to many types of door materials and sizes.

For increased accuracy, the installer can calibrate the knock detector to the particular door. To calibrate the knock detector, the installer can knock multiple times on the door with various amounts of force, at various points on the door. The knock detector can then adjust the pre-programmed time duration range to accommodate the durations from the example knock pulses.

The monitoring system can use a machine learning process to identify time durations that correspond to door knock sounds. The monitoring system can be trained with time duration data for knock events, and time duration data for other sounds. Over time, as additional data is collected, the monitoring system can improve its accuracy in differentiating the time durations of various sounds.

In FIG. 4A, the initial amplitude 410a of the sound is above $A_{req}$ 430a. As the sound diminishes, the amplitude 410a of the sound drops below $A_{req}$ 430a. In FIG. 4A, the amplitude 410a of the sound reaches $A_{req}$ 430a at a time between $t_x$ 440a and $t_y$ 450a. Therefore, the sound can be considered a potential knock event, and the monitoring system continues to evaluate other parameters of the sound.

By filtering for time duration, the knock detector 110 can reduce false alarms and improve detection accuracy. Sounds that have a time duration less than $t_x$ 440a or greater than $t_y$ 450a are not processed as potential knock events. For example, the sound of a human speaking, or of a car radio playing music, may be eliminated because of their long durations.

In FIG. 4B, the measured amplitude 410b of the sound is graphed over time 420b. There are two pulses, possibly correlating to two knocks on a door. The system verifies that the two pulses are registered within a specified periodicity.

When a person knocks on a door, he or she typically knocks more than one time. Thus, a typical knock event includes two or more pulses within a few seconds. There is a limit to the speed at which a human can deliver a second knock after a first knock. Therefore, if the pulses are too close together, the sound is not a potential knock. There is also a limit to how long a person typically waits before delivering a second knock. Therefore, if the pulses are too far apart, the sound is not a potential knock.

In FIG. 4B, the amplitude 410b of the sound is initially above a required amplitude $A_{req}$ 430b. The amplitude 410b then drops below $A_{req}$ 430b at $t_{end1}$ 440b. At time $t_{end1}$ 440b, the monitoring system establishes a true period window 480b for the next pulse. If the second pulse rises above $A_{req}$ 430b between time $t_x$ 450b and $t_y$ 460b, the system continues the knock verification process. In FIG. 4B, the amplitude of the second pulse rises above $A_{req}$ 430b at time $t_{start2}$ 470b. Because the second pulse initiated within the true period window 480b, the monitoring system continues to evaluate other parameters of the sound.

The monitoring system can use a machine learning process to identify periodicities that correspond to door knock sounds. The monitoring system can be trained with pulse periodicity data for knock events, and pulse periodicity data for other sounds. Over time, as additional data is collected, the monitoring system can improve its accuracy in differentiating the periodicities of various sounds.

By filtering for pulse periodicity, the knock detector 110 can reduce false alarms and improve detection accuracy. If a second pulse occurs before $t_x$, the pulse periodicity is too rapid for the second pulse to be a knock event. If the second pulse occurs after $t_y$, the pulse periodicity is too slow to be a knock event. For example, the sound of a car horn blast may be eliminated because there is not a second pulse within the true period window 480b.

In some implementations, the monitoring system can measure the peak-to-peak period, which is the time between peak amplitudes. For example, the monitoring system can measure the time between the peak amplitudes of the first pulse and the second pulse, and between the second pulse and the third pulse. The monitoring system can compare the peak-to-peak period with a pre-programmed range of peak-to-peak periods that correspond to door knock sounds.

For additional security, the monitoring system can be programmed to detect knock patterns by measuring the peak-to-peak periods. A resident may program the monitoring system to associate specific knock patterns with specific visitors. For example, family members may use a specific family knock pattern, while friends may use a specific friend knock pattern. An example knock pattern can be two rapid knocks, followed by a delay, followed by a third knock.

Referring to FIG. 1, the monitoring server 150 can be programmed with rules 155 that determine the actions 160 to perform when the monitoring system detects specific knock patterns, and based on the monitoring system status. For example, a rule 155 may be that when the monitoring system detects the family knock pattern, and the monitoring system status is "unarmed," the surveillance camera 177 turns off or remains off, and the doorbell chime 180 rings. Another example rule 155 may be that if no specific knock pattern is detected, and the monitoring system status is "armed, away," the surveillance camera 177 turns on, the door 125 locks or remains locked, and the monitoring system sends a notification to the resident's 170 mobile device indicating that an unknown knock was detected.

In some implementations, the knock detector can measure the duration of the entire potential knock event. For example, if a potential knock event includes four sound pulses, the knock detector can measure the time from when the first sound pulse amplitude rises above the required amplitude to when the fourth sound pulse amplitude falls below the required amplitude. The monitoring system can compare the event duration to a pre-programmed range of event durations that corresponds to a knock event. If the event duration is within a specified time range, the monitoring system continues to evaluate the audio signal. If the amplitude of the audio signal is outside of the specified time range, the monitoring system determines that the source of the sound energy is not a knock event. For example, a bird may chirp repeatedly with chirp time durations and periodicities similar to that of a door knock. However, if the bird continues to chirp for longer than the specified time range, the monitoring system can determine that the source of the sound is not a knock event.

Figure 5:
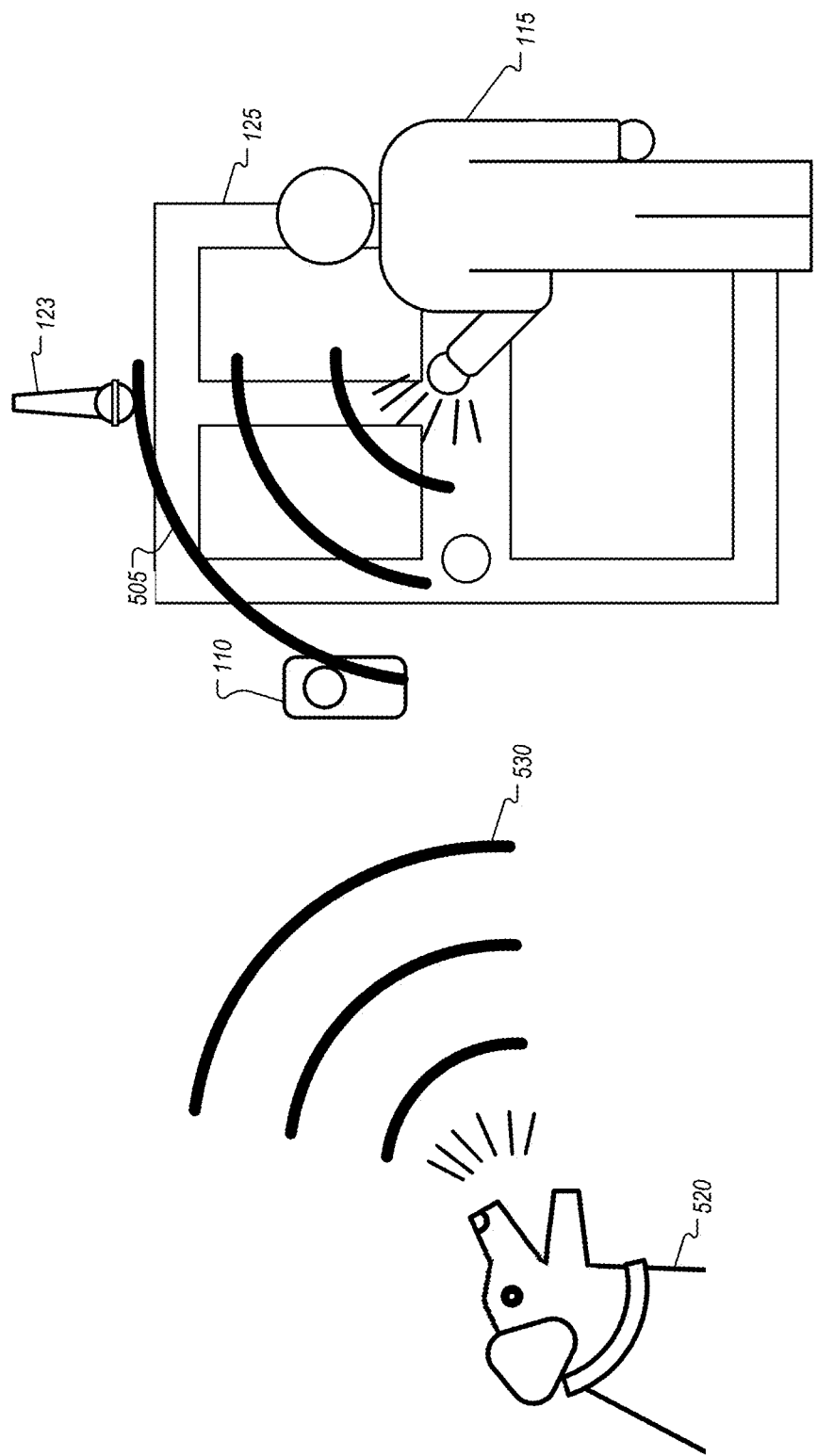
FIG. 5 is a diagram illustrating directionality detection for example knock events.

In FIG. 5, the microphone 123 is installed near the door 125 to detect the directionality of sound. The knock detector 110 and microphone 123 use phase detection to determine the direction of sound sources.

When the visitor 115 knocks on the door 125, the knock detector 110 and microphone 123 detect sound waves 505. The monitoring system measures the phase difference between the sound detected by the knock detector 110 and the microphone 123 to determine the time delay between the sound waves 505 reaching each sensor. By measuring the time delay between the sound waves 505 reaching the knock detector 110 and the microphone 123, the monitoring system can determine the direction of the sources of the sound. Each added microphone improves the accuracy of measured directionality.

In the example of FIG. 5, the sound waves 505 from a knock in the center of the door 125 reach the knock detector 110 at approximately the same time as they reach the microphone 123. If the visitor 115 knocks on a lower point on the door 125, the sound waves 505 reach the knock detector 110 slightly before reaching the microphone 123. If the visitor 115 knocks at a higher point on the door 125, the sound waves 505 reach the microphone 123 slightly before reaching the microphone. Thus, there is a range of time delays that can correspond to a knock on the door 125.

If the knock detector 110 detects a sound before the microphone 123 detects the sound, the direction of the sound is likely to the left of the door 125. For example, if a dog 520 barks to the left of the door, the sound waves 530 will reach the knock detector 110 before reaching the microphone 123. Based on the phase difference in the detected sound waves 530, the monitoring system can determine that the sound of the barking dog 520 is not a potential knock event. Likewise, if the microphone 123 detects a sound before the knock detector 110 detects the sound, the direction of the sound is likely to the right of the door 125.

For increased accuracy, the installer can calibrate the knock detector 110 for particular installation locations. The installer can knock multiple times on the door 125 at various points on the door. The knock detector 110 can then adjust its directionality to account for the various knock locations. The calibration accounts for the relative locations of the door 125, the knock detector 110, and the microphone 123.

The monitoring system can also use a machine learning process to identify directionality that corresponds to door knock sounds. The monitoring system can be trained with directionality data for knock events, and directionality data for other sounds. Over time, as additional data is collected, the monitoring system can improve its accuracy in differentiating the directionalities of various sounds.

By filtering for directionality, the knock detector 110 can reduce false alarms and improve detection accuracy. Sounds that originate from a direction away from the door 125 are not processed as potential knock events. For example, the sound of an airplane flying overhead may be eliminated because of their directionality. Additionally, for properties that are located close together, such as townhomes, directionality can differentiate a door knock on one property from a door knock on a neighboring property.

Figure 6:
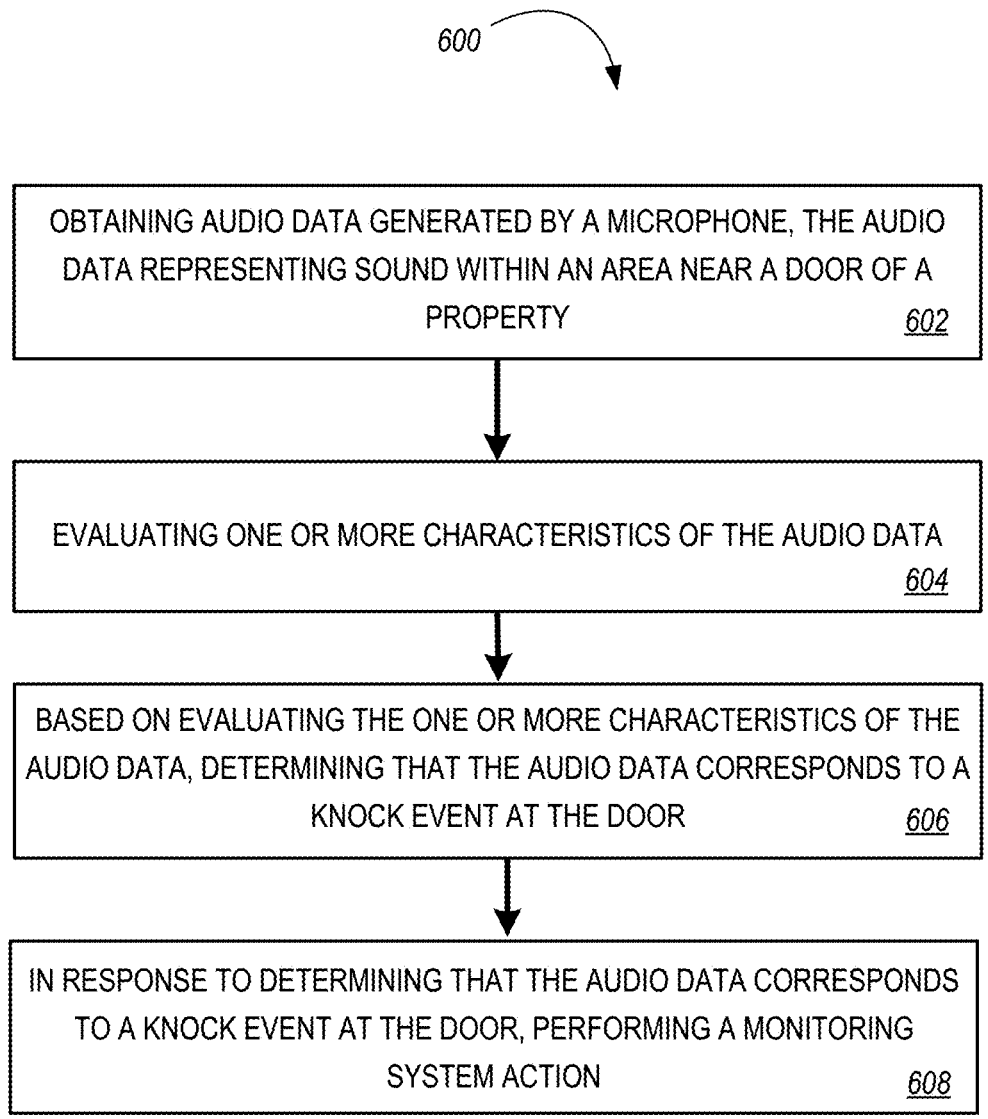
FIG. 6 is a flow chart illustrating an example method for property control and configuration based on door knock detection.

FIG. 6 is a flow chart illustrating an example of a process for property control and configuration based on door knock detection. Process 600 can be performed by one or more computer systems, for example, the monitoring server 150 of system 100. In some implementations, some or all of the process can be performed by the control unit 135 or the door knock detector 110 of the system 100, or by another computer system of the monitoring system.

Briefly, process 600 includes obtaining audio data and evaluating one or more characteristics of the audio data. Process 600 includes determining whether the audio data corresponds to a knock event. Process 600 also includes performing a monitoring system action in response to determining whether the audio data corresponds to a knock event.

In more detail, the process 600 includes obtaining audio data generated by a microphone, the audio data representing sound within an area near a door of a property (602). The microphone is configured to detect sound within an area near a door of the property and generate audio data that represents the sound. For example, the microphone of the knock detector 110 is located near the door 125 of the property 105. The microphone of the knock detector 110 is configured to detect sound within an area near the door 125 and to generate audio data 148 that represents the sound. The microphone can be integrated with a doorbell device, or can be a separate microphone device. The microphone of the knock detector receives sound energy and converts the sound energy to an audio signal.

The process 600 can include obtaining second audio data generated by a second microphone. The second microphone can be configured to detect the sound within the area near the door of the property and generate second audio data that represents the sound. For example, the microphone 123 is located near the door 125 and can detect sounds near the door 125. Additional microphones, e.g., the microphone 123, can improve directionality and accuracy.

The process 600 includes evaluating one or more characteristics of the audio data (604). The one or more characteristics of the audio data can include one or more of a duration, a peak frequency, an amplitude, or a period. The monitoring system can determines the characteristics of time duration, frequency domain peak, amplitude, and period, using audio signal analysis. The time duration characteristic can be the time duration of each sound pulse, e.g., each door knock. The time duration characteristic can also be the time duration of an entire sound event, e.g., a series of door knocks. The frequency domain peak characteristic can be the frequency of maximum amplitude as measured using frequency domain signal analysis. The amplitude characteristic can indicate the power, or volume, of the audio data. The period characteristic can be the time between sound pulses, e.g., the time between door knocks.

The one or more characteristics of the audio data can also include a time delay between the audio data and the second audio data. For example, the sound waves 505 may reach the knock detector 110 and the microphone 123 at approximately the same time. Thus, the time delay between the audio data and the second audio data for the sound waves 505 may be approximately zero.

The process 600 includes, based on evaluating the one or more characteristics of the audio data, determining that the audio data corresponds to a knock event at the door (606). Determining that the audio data corresponds to a knock event at the door includes determining that the one or more characteristics of the audio data each satisfy criteria for a knock event.

Rules can establish the parameters for sounds that correspond to a knock at the door of the property. The monitoring system compares the parameters of the audio signal to pre-programmed parameters that correspond to the sound of a knock. If the parameters of the audio signal are within the pre-programmed ranges, the monitoring system determines that the source of the sound is a knock event.

Determining that the period of the audio data satisfies criteria for a knock event can include determining that a length of time between audio pulses of the audio data is between a minimum length of time and a maximum length of time. The length of time between audio pulses can be a time between the end of a first audio pulse and the beginning of the next audio pulse. The end of the first audio pulse can be the time that the amplitude of the audio pulse falls below a required amplitude, e.g, $A_{req}$ 430b. The beginning of the next audio pulse can be the time that the amplitude of the next audio pulse rises above the required amplitude $A_{req}$ 430b.

For example, a minimum length of time may be 0.2 seconds, and a maximum length of time may be 1.0 seconds. The monitoring system may determine that the period of the audio data is 0.5 seconds. Thus, the monitoring system can determine that the period of the audio data satisfies criteria for the knock event.

Determining that the duration of the audio data satisfies criteria for a knock event can include determining that a time between a beginning of an audio pulse of the audio data and an end of the audio pulse of the audio data is between a minimum duration and a maximum duration. The beginning of the audio pulse of the audio data can be the time that the amplitude of the audio data rises above a required amplitude, e.g., $A_{req}$ 430a. The end of the audio pulse can be the time that the amplitude of the audio pulse falls below the required amplitude $A_{req}$ 430a.

For example, a minimum duration may be 0.05 seconds, and a maximum duration may be 0.2 seconds. The monitoring system may determine that the duration of the audio data is 0.1 seconds. Thus, the monitoring system can determine that the duration of the audio data is between the minimum duration and the maximum duration, and therefore satisfies criteria for the knock event.

Determining that the peak frequency of the audio data satisfies criteria for a knock event can include determining that a frequency of peak amplitude of the audio data is between a minimum frequency and a maximum frequency. The frequency of peak amplitude of the audio data can be the frequency of maximum amplitude as measured using frequency domain analysis.

For example, a minimum frequency may be 250 Hz and a maximum frequency may be 350 Hz. The monitoring system may determine that the peak frequency of the audio data is 300 Hz. Thus, the monitoring system can determine that the peak frequency of the audio data satisfies criteria for the knock event.

Determining that the amplitude of the audio data satisfies criteria for a knock event can include determining that an amplitude of an audio pulse of the audio data is between a minimum amplitude and a maximum amplitude. The amplitude of the audio pulse can be the maximum sound volume of the audio pulse.

For example, a minimum amplitude may be 45 dB, and a maximum amplitude may be 60 dB. The monitoring system may determine that the amplitude of the audio data is 50 dB. Thus, the monitoring system can determine that the amplitude of the audio data satisfies criteria for a knock event.

Determining that the audio data corresponds to a knock event at the door can include determining that the time delay between the audio data and the second audio data satisfies criteria for a knock event. Determining that the time delay between the audio data and the second audio data satisfies criteria for a knock event can include determining that the time delay is between a minimum time delay and a maximum time delay. The time delay can be indicative of a directionality of the sound, e.g., the direction of propagation of sound waves in relation to the positions of the microphone, e.g., knock detector 110 and the second microphone, e.g., microphone 123. The monitoring system can determine the time delay between the audio data and the second audio data based on a phase difference between sound detected by the microphone and sound detected by the second microphone.

For example, a minimum time delay between the audio data and the second audio data may be −0.05 milliseconds (ms), and a maximum time delay between the audio data and the second audio data may be +0.1 ms. The monitoring system can determine that the time delay between the audio data and the second audio data is +0.05 ms. Thus, the monitoring system can determine that the time delay between the audio data and the second audio data satisfies criteria for a knock event Determining that the audio data corresponds to a knock event at the door can include determining that a first characteristic of the audio data satisfies criteria for a knock event, and in response to determining that the first characteristic of the audio data satisfies criteria for a knock event, evaluating a second characteristic of the audio data.

For example, the monitoring system may determine that the amplitude of the audio data satisfies criteria for a knock event. In response to determining that the amplitude of the audio data satisfies criteria for a knock event, the monitoring system evaluates the periodicity of the audio data.

In another example, the monitoring system may determine that the amplitude of the audio data does not satisfy criteria for a knock event. In response to determining that the amplitude of the audio data does not satisfy criteria for a knock event, the monitoring system does not evaluate the periodicity of the audio data.

Determining that the audio data corresponds to a knock event at the door can include determining that the second characteristic of the audio data satisfies criteria for a knock event, and in response to determining that the second characteristic of the audio data satisfies criteria for a knock event, determining that the audio data corresponds to a knock event at the door.

For example, the monitoring system may determine that the periodicity of the audio data satisfies criteria for a knock event. In response to determining that the periodicity of the audio data satisfies criteria for a knock event, the monitoring system determines that the audio data corresponds to a knock event at the door.

In another example, the monitoring system may determine that the periodicity of the audio data does not satisfy criteria for a knock event. In response to determining that the periodicity of the audio data does not satisfy criteria for a knock event, the monitoring system determines that the audio data does not correspond to a knock event at the door.

The first characteristic of the audio data can include an amplitude of the audio data. The second characteristic of the audio data can include one of a peak frequency, a time duration, a period, or a directionality of the audio data.

In some cases, determining that the audio data corresponds to a knock event at the door can include determining that a first characteristic of the audio data satisfies criteria for a knock event, and in response to determining that the first characteristic of the audio data satisfies criteria for a knock event, evaluating a second characteristic of the audio data.

For example, the monitoring system may determine that the amplitude of the audio data satisfies criteria for a knock event. In response to determining that the amplitude of the audio data satisfies criteria for a knock event, the monitoring system evaluates the time duration of the audio data.

In another example, the monitoring system may determine that the amplitude of the audio data does not satisfy criteria for a knock event. In response to determining that the amplitude of the audio data does not satisfy criteria for a knock event, the monitoring system does not evaluate the time duration of the audio data.

Determining that the audio data corresponds to a knock event at the door can include determining that the second characteristic of the audio data satisfies criteria for a knock event, and in response to determining that the second characteristic of the audio data satisfies criteria for a knock event, evaluating a third characteristic of the audio data.

For example, the monitoring system may determine that the time duration of the audio data satisfies criteria for a knock event. In response to determining that the time duration of the audio data satisfies criteria for a knock event, the monitoring system evaluates the directionality of the audio data.

In another example, the monitoring system may determine that the time duration of the audio data does not satisfy criteria for a knock event. In response to determining that the time duration of the audio data does not satisfy criteria for a knock event, the monitoring system does not evaluate the directionality of the audio data.

Determining that the audio data corresponds to a knock event at the door can include determining that the third characteristic satisfies criteria for a knock event, and in response to determining that the third characteristic of the audio data satisfies criteria for a knock event, determining that the audio data corresponds to a knock event at the door.

For example, the monitoring system may determine that the directionality of the audio data satisfies criteria for a knock event. In response to determining that the directionality of the audio data satisfies criteria for a knock event, the monitoring system determines that the audio data corresponds to a knock event at the door.

In another example, the monitoring system may determine that the directionality of the audio data does not satisfy criteria for a knock event. In response to determining that the directionality of the audio data does not satisfy criteria for a knock event, the monitoring system determines that the audio data does not correspond to a knock event at the door.

The first characteristic of the audio data can include an amplitude of the audio data. The second characteristic can include a peak frequency of the audio data. The third characteristic can include one of a time duration, a period, or a directionality of the audio data.

Determining that the audio data corresponds to a knock event at the door can include providing the audio data as an input to a machine learning model that has been trained to determine whether audio data corresponds to a knock event at the door, and receiving an output from the machine learning model that indicates that the audio data corresponds to a knock event at the door. Determining that the audio data corresponds to a knock event at the door can include determining, based on the received output from the machine learning model, that the audio data corresponds to a knock event at the door. For example, the machine learning model can be trained with audio data that corresponds to knock events, and audio data that does not correspond to knock events. The accuracy of the model for determining knock events improves over time as additional data is collected.

The process 600 includes, in response to determining that the audio data corresponds to a knock event at the door, performing a monitoring system action (608).

Performing the monitoring system action can include determining a particular monitoring system action to perform based on one or more of a monitoring system arming status, a time of day, or an occupancy of the property. For example, the monitoring system may determine a particular action based on a monitoring system arming status of "armed, stay," a time of day of 8:00 μm, and an occupancy of four people. The particular action may include activating a doorbell chime, e.g., doorbell chime 180, and turning on a porch light, e.g., porch light 175. The monitoring system may determine a different action based on a monitoring system arming status of "armed, away," a time of 12:00 μm, and an occupancy of zero people. The particular action may include sending a notification to a mobile device of the resident 170 and activating a camera, e.g., surveillance camera 177.

The monitoring system action can include providing a notification of the knock event. For example, the monitoring system action can include providing a notification to the control panel 165 and/or to a mobile device of the resident 170. The notification can include, for example, a message indicating that the knock event occurred, a time that the knock event occurred, and a captured image or video of the area near the door 125 at the time of the door knock event.

The monitoring system action can include providing an instruction to one or more devices at the property to one or more of activate a doorbell chime, to activate a camera to record images of the area near the door, or to illuminate the area near the door. For example, the monitoring system action can include providing an instruction to the surveillance camera 177 to record images of the area near the door 125, and to the porch light 175 to turn on.

The monitoring system may determine actions that include sending a notification to a mobile device, sending an instruction to the automation controls to adjust a setting at the property, sending a command to a sensor to collect and send additional sensor data, sounding an alarm of the property, or sending an alert to a third-party, such as security personnel or emergency services. In the event of a door knock, example actions can include activating a surveillance camera, turning on a porch light, activating a door chime, and sending a notification to a control panel.

Figure 7:
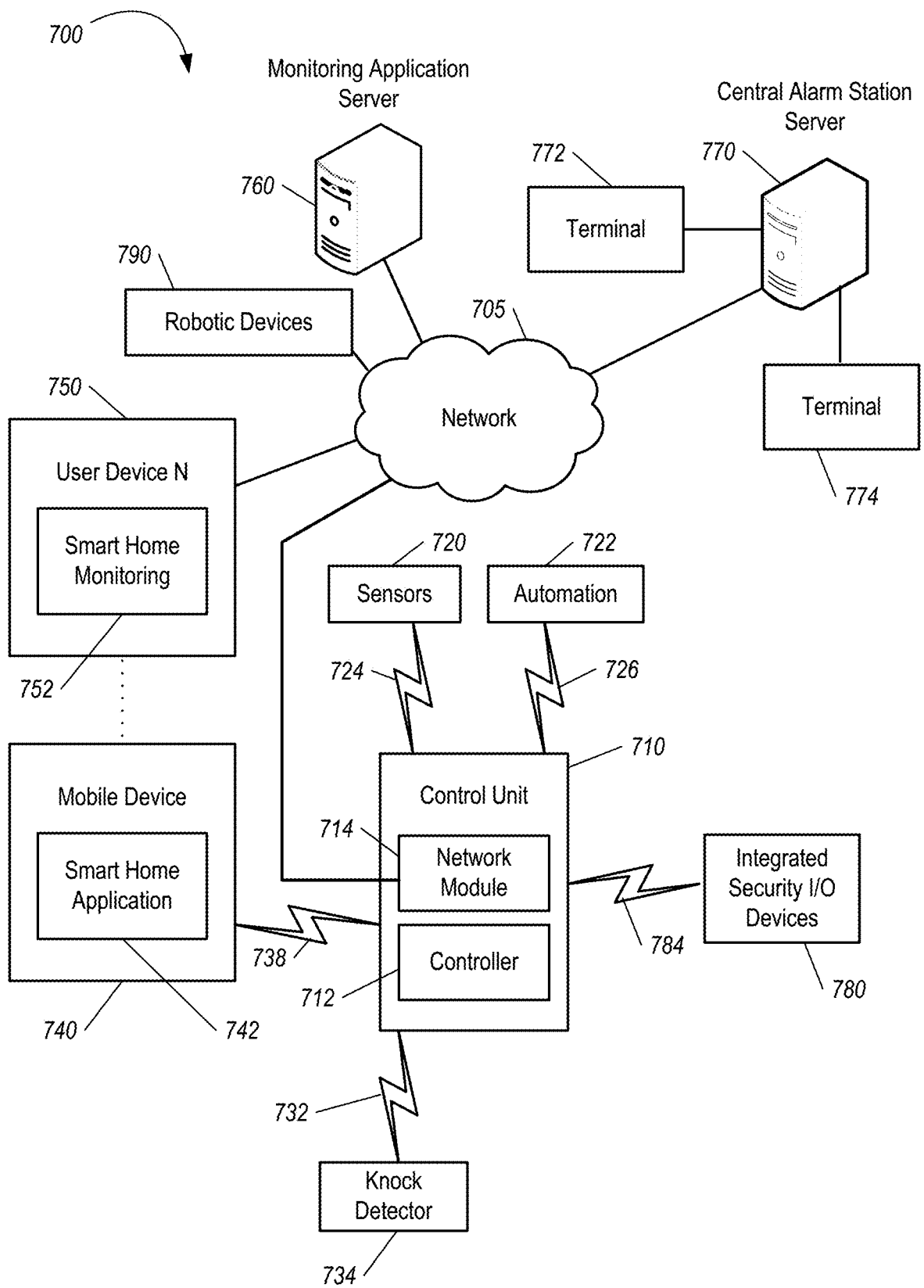
FIG. 7 is a diagram illustrating an example of a property monitoring system.

FIG. 7 is a diagram illustrating an example of a property monitoring system 700. The system 700 includes a network 705, a control unit 710, one or more user devices 740 and 750, a monitoring server 760, and a central alarm station server 770. In some examples, the network 705 facilitates communications between the control unit 710, the one or more user devices 740 and 750, the monitoring server 760, and the central alarm station server 770.

A knock detector 734 connects to the network 705 through the control unit 710. The network 705 is configured to enable exchange of electronic communications between devices connected to the network 705. For example, the network 705 may be configured to enable exchange of electronic communications between the control unit 710, the one or more user devices 740 and 750, the monitoring server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The control unit 710 includes a controller 712 and a network module 714. The controller 712 is configured to control a control unit monitoring system (e.g., a control unit system) that includes the control unit 710. In some examples, the controller 712 may include a processor or other control circuitry configured to execute instructions of a program that controls operation of a control unit system. In these examples, the controller 712 may be configured to receive input from sensors, knock detectors, or other devices included in the control unit system and control operations of devices included in the household (e.g., speakers, lights, doors, etc.). For example, the controller 712 may be configured to control operation of the network module 714 included in the control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the control unit 710 to communicate over a local area network and/or the Internet. The network module 714 also may be a voice band modem configured to enable the alarm panel to communicate over the telephone lines of Plain Old Telephone Systems (POTS).

The control unit system that includes the control unit 710 includes one or more sensors 720. For example, the monitoring system may include multiple sensors 720. The sensors 720 may include a lock sensor, a contact sensor, a motion sensor, or any other type of sensor included in a control unit system. The sensors 720 also may include an environmental sensor, such as a thermometer, a water sensor, a rain sensor, a wind sensor, a light sensor, a smoke detector, a carbon monoxide detector, an air quality sensor, etc.

The system 700 also includes one or more property automation controls 722 that communicate with the control unit 710 to perform monitoring. The property automation controls 722 are connected to one or more devices connected to the system 700 and enable automation of actions at the property. For instance, the property automation controls 722 may be connected to one or more lighting systems and may be configured to control operation of the one or more lighting systems. Also, the property automation controls 722 may be connected to one or more electronic locks at the property and may be configured to control operation of the one or more electronic locks (e.g., control Z-Wave locks using wireless communications in the Z-Wave protocol). Further, the property automation controls 722 may be connected to one or more appliances at the property and may be configured to control operation of the one or more appliances. The property automation controls 722 may include multiple modules that are each specific to the type of device being controlled in an automated manner. The property automation controls 722 may control the one or more devices based on commands received from the control unit 710. For instance, the property automation controls 722 may interrupt power delivery to a particular outlet of the property or induce movement of a smart window shade of the property.

In some examples, the system 700 includes one or more robotic devices 790. The robotic devices 790 may be any type of robot that are capable of moving and taking actions that assist in home monitoring. For example, the robotic devices 790 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 790 may be robotic devices 790 that are intended for other purposes and merely associated with the system 700 for use in appropriate circumstances. For instance, a robotic aerial drone may be associated with the monitoring system 700 as one of the robotic devices 790 and may be controlled to take action responsive to monitoring system events.

In some examples, the robotic devices 790 automatically navigate within a property. In these examples, the robotic devices 790 include sensors and control processors that guide movement of the robotic devices 790 within the property. For instance, the robotic devices 790 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 790 may include control processors that process output from the various sensors and control the robotic devices 790 to move along a path that reaches the desired destination and avoids obstacles. In this regard, the control processors detect walls or other obstacles in the property and guide movement of the robotic devices 790 in a manner that avoids the walls and other obstacles.

In addition, the robotic devices 790 may store data that describes attributes of the property. For instance, the robotic devices 790 may store a floorplan of a building on the property and/or a three-dimensional model of the property that enables the robotic devices 790 to navigate the property. During initial configuration, the robotic devices 790 may receive the data describing attributes of the property, determine a frame of reference to the data (e.g., a property or reference location in the property), and navigate the property based on the frame of reference and the data describing attributes of the property. Further, initial configuration of the robotic devices 790 also may include learning of one or more navigation patterns in which a user provides input to control the robotic devices 790 to perform a specific navigation action (e.g., fly to an upstairs bedroom and spin around while capturing video and then return to a home charging base). In this regard, the robotic devices 790 may learn and store the navigation patterns such that the robotic devices 790 may automatically repeat the specific navigation actions upon a later request.

In some examples, the robotic devices 790 may include data capture and recording devices. In these examples, the robotic devices 790 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property.

In some implementations, the robotic devices 790 may include output devices. In these implementations, the robotic devices 790 may include one or more displays, one or more speakers, and/or any type of output devices that allow the robotic devices 790 to communicate information to a nearby user.

The robotic devices 790 also may include a communication module that enables the robotic devices 790 to communicate with the control unit 710, each other, and/or other devices. The communication module may be a wireless communication module that allows the robotic devices 790 to communicate wirelessly. For instance, the communication module may be a Wi-Fi module that enables the robotic devices 790 to communicate over a local wireless network at the property. The communication module further may be a 900 MHz wireless communication module that enables the robotic devices 790 to communicate directly with the control unit 710. Other types of short-range wireless communication protocols, such as Bluetooth, Bluetooth LE, Z-wave, Zigbee, etc., may be used to allow the robotic devices 790 to communicate with other devices in the property. In some implementations, the robotic devices 790 may communicate with each other or with other devices of the system 700 through the network 705.

The robotic devices 790 further may include processor and storage capabilities. The robotic devices 790 may include any suitable processing devices that enable the robotic devices 790 to operate applications and perform the actions described throughout this disclosure. In addition, the robotic devices 790 may include solid state electronic storage that enables the robotic devices 790 to store applications, configuration data, collected sensor data, and/or any other type of information available to the robotic devices 790.

The robotic devices 790 can be associated with one or more charging stations. The charging stations may be located at predefined home base or reference locations at the property. The robotic devices 790 may be configured to navigate to the charging stations after completion of tasks needed to be performed for the monitoring system 700. For instance, after completion of a monitoring operation or upon instruction by the control unit 710, the robotic devices 790 may be configured to automatically fly to and land on one of the charging stations. In this regard, the robotic devices 790 may automatically maintain a fully charged battery in a state in which the robotic devices 790 are ready for use by the monitoring system 700.

The charging stations may be contact-based charging stations and/or wireless charging stations. For contact-based charging stations, the robotic devices 790 may have readily accessible points of contact that the robotic devices 790 are capable of positioning and mating with a corresponding contact on the charging station. For instance, a helicopter type robotic device 790 may have an electronic contact on a portion of its landing gear that rests on and mates with an electronic pad of a charging station when the helicopter type robotic device 790 lands on the charging station. The electronic contact on the robotic device 790 may include a cover that opens to expose the electronic contact when the robotic device 790 is charging and closes to cover and insulate the electronic contact when the robotic device is in operation.

For wireless charging stations, the robotic devices 790 may charge through a wireless exchange of power. In these cases, the robotic devices 790 need only locate themselves closely enough to the wireless charging stations for the wireless exchange of power to occur. In this regard, the positioning needed to land at a predefined home base or reference location in the property may be less precise than with a contact based charging station. Based on the robotic devices 790 landing at a wireless charging station, the wireless charging station outputs a wireless signal that the robotic devices 790 receive and convert to a power signal that charges a battery maintained on the robotic devices 790.

In some implementations, each of the robotic devices 790 has a corresponding and assigned charging station such that the number of robotic devices 790 equals the number of charging stations. In these implementations, the robotic devices 790 always navigate to the specific charging station assigned to that robotic device. For instance, a first robotic device 790 may always use a first charging station and a second robotic device 790 may always use a second charging station.

In some examples, the robotic devices 790 may share charging stations. For instance, the robotic devices 790 may use one or more community charging stations that are capable of charging multiple robotic devices 790. The community charging station may be configured to charge multiple robotic devices 790 in parallel. The community charging station may be configured to charge multiple robotic devices 790 in serial such that the multiple robotic devices 790 take turns charging and, when fully charged, return to a predefined home base or reference location in the property that is not associated with a charger. The number of community charging stations may be less than the number of robotic devices 790.

Also, the charging stations may not be assigned to specific robotic devices 790 and may be capable of charging any of the robotic devices 790. In this regard, the robotic devices 790 may use any suitable, unoccupied charging station when not in use. For instance, when one of the robotic devices 790 has completed an operation or is in need of battery charge, the control unit 710 references a stored table of the occupancy status of each charging station and instructs the robotic device 790 to navigate to the nearest charging station that is unoccupied.

The system 700 further includes one or more integrated security devices 780. The one or more integrated security devices may include any type of device used to provide alerts based on received sensor data. For instance, the one or more control units 710 may provide one or more alerts to the one or more integrated security input/output devices 780. Additionally, the one or more control units 710 may receive one or more sensor data from the sensors 720 and determine whether to provide an alert to the one or more integrated security input/output devices 780.

The sensors 720, the property automation controls 722, and the integrated security devices 780 may communicate with the controller 712 over communication links 724, 726, 732, and 784. The communication links 724, 726, 732, and 784 may be a wired or wireless data pathway configured to transmit signals from the sensors 720, the property automation controls 722, the knock detector 734, and the integrated security devices 780 to the controller 712. The sensors 720, the property automation controls 722, the knock detector 734, and the integrated security devices 780 may continuously transmit sensed values to the controller 712, periodically transmit sensed values to the controller 712, or transmit sensed values to the controller 712 in response to a change in a sensed value.

The communication links 724, 726, 732, and 784 may include a local network. The sensors 720, the property automation controls 722, the knock detector 734, and the integrated security devices 780, and the controller 712 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 760 is one or more electronic devices configured to provide monitoring services by exchanging electronic communications with the control unit 710, the one or more user devices 740 and 750, and the central alarm station server 770 over the network 705. For example, the monitoring server 760 may be configured to monitor events (e.g., alarm events) generated by the control unit 710. In this example, the monitoring server 760 may exchange electronic communications with the network module 714 included in the control unit 710 to receive information regarding events (e.g., alerts) detected by the control unit 710. The monitoring server 760 also may receive information regarding events (e.g., alerts) from the one or more user devices 740 and 750.

In some examples, the monitoring server 760 may route alert data received from the network module 714 or the one or more user devices 740 and 750 to the central alarm station server 770. For example, the monitoring server 760 may transmit the alert data to the central alarm station server 770 over the network 705.

The monitoring server 760 may store sensor data and other monitoring system data received from the monitoring system and perform analysis of the sensor data and other monitoring system data received from the monitoring system. Based on the analysis, the monitoring server 760 may communicate with and control aspects of the control unit 710 or the one or more user devices 740 and 750.

The monitoring server 760 may provide various monitoring services to the system 700. For example, the monitoring server 760 may analyze the sensor and other data to determine an activity pattern of a resident of the property monitored by the system 700. In some implementations, the monitoring server 760 may analyze the data for alarm conditions or may determine and perform actions at the property by issuing commands to one or more of the automation controls 722, possibly through the control unit 710.

The central alarm station server 770 is an electronic device configured to provide alarm monitoring service by exchanging communications with the control unit 710, the one or more mobile devices 740 and 750, and the monitoring server 760 over the network 705. For example, the central alarm station server 770 may be configured to monitor alerting events generated by the control unit 710. In this example, the central alarm station server 770 may exchange communications with the network module 714 included in the control unit 710 to receive information regarding alerting events detected by the control unit 710. The central alarm station server 770 also may receive information regarding alerting events from the one or more mobile devices 740 and 750 and/or the monitoring server 760.

The central alarm station server 770 is connected to multiple terminals 772 and 774. The terminals 772 and 774 may be used by operators to process alerting events. For example, the central alarm station server 770 may route alerting data to the terminals 772 and 774 to enable an operator to process the alerting data. The terminals 772 and 774 may include general-purpose computers (e.g., desktop personal computers, workstations, or laptop computers) that are configured to receive alerting data from a server in the central alarm station server 770 and render a display of information based on the alerting data. For instance, the controller 712 may control the network module 714 to transmit, to the central alarm station server 770, alerting data indicating that a sensor 720 detected motion from a motion sensor via the sensors 720. The central alarm station server 770 may receive the alerting data and route the alerting data to the terminal 772 for processing by an operator associated with the terminal 772. The terminal 772 may render a display to the operator that includes information associated with the alerting event (e.g., the lock sensor data, the motion sensor data, the contact sensor data, etc.) and the operator may handle the alerting event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more authorized user devices 740 and 750 are devices that host and display user interfaces. For instance, the user device 740 is a mobile device that hosts or runs one or more native applications (e.g., the smart home application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a smart home application 742. The smart home application 742 refers to a software/firmware program running on the corresponding mobile device that enables the user interface and features described throughout. The user device 740 may load or install the smart home application 742 based on data received over a network or data received from local media. The smart home application 742 runs on mobile devices platforms, such as iPhone, iPod touch, Blackberry, Google Android, Windows Mobile, etc. The smart home application 742 enables the user device 740 to receive and process power and sensor data from the monitoring system.

The user device 750 may be a general-purpose computer (e.g., a desktop personal computer, a workstation, or a laptop computer) that is configured to communicate with the monitoring server 760 and/or the control unit 710 over the network 705. The user device 750 may be configured to display a smart home user interface 752 that is generated by the user device 750 or generated by the monitoring server 760. For example, the user device 750 may be configured to display a user interface (e.g., a web page) provided by the monitoring server 760 that enables a user to perceive data captured by the knock detector 734 and/or reports related to the monitoring system. Although FIG. 7 illustrates two user devices for brevity, actual implementations may include more (and, perhaps, many more) or fewer user devices.

The smart home application 742 and the smart home user interface 752 can allow a user to interface with the property monitoring system 700, for example, allowing the user to view monitoring system settings, adjust monitoring system parameters, customize monitoring system rules, and receive and view monitoring system messages.

In some implementations, the one or more user devices 740 and 750 communicate with and receive monitoring system data from the control unit 710 using the communication link 738. For instance, the one or more user devices 740 and 750 may communicate with the control unit 710 using various local wireless protocols such as Wi-Fi, Bluetooth, Z-wave, Zigbee, HomePlug (ethernet over power line), or wired protocols such as Ethernet and USB, to connect the one or more user devices 740 and 750 to local security and automation equipment. The one or more user devices 740 and 750 may connect locally to the monitoring system and its sensors and other devices. The local connection may improve the speed of status and control communications because communicating through the network 705 with a remote server (e.g., the monitoring server 760) may be significantly slower.

Although the one or more user devices 740 and 750 are shown as communicating with the control unit 710, the one or more user devices 740 and 750 may communicate directly with the sensors 720 and other devices controlled by the control unit 710. In some implementations, the one or more user devices 740 and 750 replace the control unit 710 and perform the functions of the control unit 710 for local monitoring and long range/offsite communication.

In other implementations, the one or more user devices 740 and 750 receive monitoring system data captured by the control unit 710 through the network 705. The one or more user devices 740, 750 may receive the data from the control unit 710 through the network 705 or the monitoring server 760 may relay data received from the control unit 710 to the one or more user devices 740 and 750 through the network 705. In this regard, the monitoring server 760 may facilitate communication between the one or more user devices 740 and 750 and the monitoring system 700.

In some implementations, the one or more user devices 740 and 750 may be configured to switch whether the one or more user devices 740 and 750 communicate with the control unit 710 directly (e.g., through link 738) or through the monitoring server 760 (e.g., through network 705) based on a location of the one or more user devices 740 and 750. For instance, when the one or more user devices 740 and 750 are located close to the control unit 710 and in range to communicate directly with the control unit 710, the one or more user devices 740 and 750 use direct communication. When the one or more user devices 740 and 750 are located far from the control unit 710 and not in range to communicate directly with the control unit 710, the one or more user devices 740 and 750 use communication through the monitoring server 760.

Although the one or more user devices 740 and 750 are shown as being connected to the network 705, in some implementations, the one or more user devices 740 and 750 are not connected to the network 705. In these implementations, the one or more user devices 740 and 750 communicate directly with one or more of the monitoring system components and no network (e.g., Internet) connection or reliance on remote servers is needed.

In some implementations, the one or more user devices 740 and 750 are used in conjunction with only local sensors and/or local devices in a house. In these implementations, the system 700 includes the one or more user devices 740 and 750, the sensors 720, the property automation controls 722, the knock detector 734, and the robotic devices 790. The one or more user devices 740 and 750 receive data directly from the sensors 720, the property automation controls 722, the knock detector 734, and the robotic devices 790 (i.e., the monitoring system components) and sends data directly to the monitoring system components. The one or more user devices 740, 750 provide the appropriate interfaces/processing to provide visual surveillance and reporting.

In other implementations, the system 700 further includes network 705 and the sensors 720, the property automation controls 722, the knock detector 734, and the robotic devices 790 are configured to communicate sensor and power data to the one or more user devices 740 and 750 over network 705 (e.g., the Internet, cellular network, etc.). In yet another implementation, the sensors 720, the property automation controls 722, the knock detector 734, and the robotic devices 790 (or a component, such as a bridge/router) are intelligent enough to change the communication pathway from a direct local pathway when the one or more user devices 740 and 750 are in close physical proximity to the sensors 720, the property automation controls 722, the knock detector 734, and the robotic devices 790 to a pathway over network 705 when the one or more user devices 740 and 750 are farther from the sensors 720, the property automation controls 722, the knock detector 734, and the robotic devices 790. In some examples, the system leverages GPS information from the one or more user devices 740 and 750 to determine whether the one or more user devices 740 and 750 are close enough to the monitoring system components to use the direct local pathway or whether the one or more user devices 740 and 750 are far enough from the monitoring system components that the pathway over network 705 is required. In other examples, the system leverages status communications (e.g., pinging) between the one or more user devices 740 and 750 and the sensors 720, the property automation controls 722, the knock detector 734, and the robotic devices 790 to determine whether communication using the direct local pathway is possible. If communication using the direct local pathway is possible, the one or more user devices 740 and 750 communicate with the sensors 720, the property automation controls 722, the knock detector 734, and the robotic devices 790 using the direct local pathway. If communication using the direct local pathway is not possible, the one or more user devices 740 and 750 communicate with the monitoring system components using the pathway over network 705.

In some implementations, the system 700 provides end users with access to the knock data captured by the knock detector 734 to aid in decision making. The system 700 may transmit the knock data captured by the knock detector 734 over a wireless WAN network to the user devices 740 and 750. Because transmission over a wireless WAN network may be relatively expensive, the system 700 can use several techniques to reduce costs while providing access to significant levels of useful visual information (e.g., compressing data, down-sampling data, sending data only over inexpensive LAN connections, or other techniques).

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system for monitoring a property, the monitoring system comprising:
   a microphone that is configured to detect sound within an area near a door of the property and generate audio data that represents the sound; and
   a monitor control unit configured to:
   obtain the audio data generated by the microphone;
   evaluate one or more characteristics of the audio data, the one or more characteristics of the audio data comprising one or more of a duration, a peak frequency, an amplitude, or a period;
   based on evaluating the one or more characteristics of the audio data, determine that the audio data corresponds to a knock event at the door by:
   determining that a frequency of peak amplitude of the audio data is between a minimum frequency and a maximum frequency for a knock event; or determining that an amplitude of an audio pulse of the audio data is between a minimum amplitude and a maximum amplitude; and in response to determining that the audio data corresponds to a knock event at the door, perform a monitoring system action.

2. The monitoring system of claim 1, comprising determining that the audio data corresponds to a knock event at least in part by determining that a time period between audio pulses of the audio data is between a minimum time period and a maximum time period.

3. The monitoring system of claim 1, comprising determining that the audio data corresponds to a knock event at least in part by determining that a time duration between a beginning of an audio pulse of the audio data and an end of the audio pulse of the audio data is between a minimum time duration and a maximum time duration.

4. The monitoring system of claim 1, comprising a second microphone configured to detect the sound within the area near the door of the property and generate second audio data that represents the sound, wherein the monitor control unit is configured to:
obtain the second audio data generated by the second microphone; and
evaluate a time delay between the audio data and the second audio data,
wherein determining that the audio data corresponds to a knock event at the door comprises determining that the time delay between the audio data and the second audio data satisfies criteria for a knock event.

5. The monitoring system of claim 4, wherein determining that the time delay between the audio data and the second audio data satisfies criteria for a knock event comprises determining that the time delay is between a minimum time delay and a maximum time delay.

6. The monitoring system of claim 1, wherein determining that the audio data corresponds to a knock event at the door comprises:
determining that a first characteristic of the audio data satisfies criteria for a knock event;
in response to determining that the first characteristic of the audio data satisfies criteria for a knock event, evaluating a second characteristic of the audio data;
determining that the second characteristic of the audio data satisfies criteria for a knock event; and
in response to determining that the second characteristic of the audio data satisfies criteria for a knock event, determining that the audio data corresponds to a knock event at the door.

7. The monitoring system of claim 6, wherein:
the first characteristic of the audio data comprises an amplitude of the audio data; and
the second characteristic of the audio data comprises one of a peak frequency, a time duration, a period, or a directionality of the audio data.

8. The monitoring system of claim 1, wherein determining that the audio data corresponds to a knock event at the door comprises:
determining that a first characteristic of the audio data satisfies criteria for a knock event;
in response to determining that the first characteristic of the audio data satisfies criteria for a knock event, evaluating a second characteristic of the audio data;
determining that the second characteristic of the audio data satisfies criteria for a knock event;

in response to determining that the second characteristic of the audio data satisfies criteria for a knock event, evaluating a third characteristic of the audio data;
determining that the third characteristic satisfies criteria for a knock event; and
in response to determining that the third characteristic of the audio data satisfies criteria for a knock event, determining that the audio data corresponds to a knock event at the door.

9. The monitoring system of claim 8, wherein:
the first characteristic of the audio data comprises an amplitude of the audio data;
the second characteristic comprises a peak frequency of the audio data; and
the third characteristic comprises one of a time duration, a period, or a directionality of the audio data.

10. The monitoring system of claim 1, wherein determining that the audio data corresponds to a knock event at the door comprises:
providing the audio data as an input to a machine learning model that has been trained to determine whether audio data corresponds to a knock event at the door;
receiving an output from the machine learning model that indicates that the audio data corresponds to a knock event at the door; and
determining, based on the received output from the machine learning model, that the audio data corresponds to a knock event at the door.

11. The monitoring system of claim 1, wherein the monitor control unit is configured to determine a particular monitoring system action to perform based on one or more of a monitoring system arming status, a time of day, or an occupancy of the property.

12. The monitoring system of claim 1, wherein the microphone is integrated with a doorbell device.

13. The monitoring system of claim 1, wherein the monitoring system action comprises providing a notification of the knock event.

14. The monitoring system of claim 1, wherein the monitoring system action comprises providing an instruction to one or more devices at the property to one or more of activate a doorbell chime, to activate a camera to record images of the area near the door, or to illuminate the area near the door.

15. A method for monitoring a property, the method comprising:
obtaining audio data generated by a microphone, the audio data representing sound within an area near a door of a property;
evaluating one or more characteristics of the audio data, the one or more characteristics of the audio data comprising one or more of a duration, a peak frequency, an amplitude, or a period;
based on evaluating the one or more characteristics of the audio data, determining that the audio data corresponds to a knock event at the door by:
determining that a frequency of peak amplitude of the audio data is between a minimum frequency and a maximum frequency for a knock event; or
determining that an amplitude of an audio pulse of the audio data is between a minimum amplitude and a maximum amplitude; and
in response to determining that the audio data corresponds to a knock event at the door, performing a monitoring system action.

16. A non-transitory computer-readable medium storing software comprising instructions executable by one or more computers which, upon such execution, cause the one or more computers to perform operations comprising:

obtaining audio data generated by a microphone, the audio data representing sound within an area near a door of a property;

evaluating one or more characteristics of the audio data, the one or more characteristics of the audio data comprising one or more of a duration, a peak frequency, an amplitude, or a period;

based on evaluating the one or more characteristics of the audio data, determining that the audio data corresponds to a knock event at the door by:

determining that a frequency of peak amplitude of the audio data is between a minimum frequency and a maximum frequency for a knock event; or determining that an amplitude of an audio pulse of the audio data is between a minimum amplitude and a maximum amplitude; and in response to determining that the audio data corresponds to a knock event at the door, performing a monitoring system action.

17. A monitoring system for monitoring a property, the monitoring system comprising:

a first microphone that is configured to detect sound within an area near a door of the property and generate first audio data that represents the sound;

a second microphone that is configured to detect the sound within the area near the door of the property and generate second audio data that represents the sound; and a monitor control unit configured to:

obtain the first audio data generated by the first microphone;

obtain the second audio data generated by the second microphone;

evaluate one or more characteristics of the first audio data;

evaluate a time delay between the first audio data and the second audio data;

based on evaluating the one or more characteristics of the first audio data, and based on determining that the time delay between the first audio data and the second audio data satisfies criteria for a knock event, determine that the first audio data corresponds to a knock event at the door; and in response to determining that the first audio data corresponds to a knock event at the door, perform a monitoring system action.

18. The monitoring system of claim 17, wherein determining that the time delay between the first audio data and the second audio data satisfies criteria for a knock event comprises determining that the time delay is between a minimum time delay and a maximum time delay.

19. A method for monitoring a property, the method comprising:

obtaining first audio data generated by a first microphone, the first audio data representing sound within an area near a door of a property;

obtaining second audio data generated by a second microphone, the second audio data representing the sound within the area near the door of the property;

evaluating one or more characteristics of the first audio data;

evaluating a time delay between the first audio data and the second audio data;

based on evaluating the one or more characteristics of the first audio data, and based on determining that the time delay between the first audio data and the second audio data satisfies criteria for a knock event, determining that the first audio data corresponds to a knock event at the door; and in response to determining that the first audio data corresponds to a knock event at the door, performing a monitoring system action.

20. The method of claim 19, wherein determining that the time delay between the first audio data and the second audio data satisfies criteria for a knock event comprises determining that the time delay is between a minimum time delay and a maximum time delay.

21. A non-transitory computer-readable medium storing software comprising instructions executable by one or more computers which, upon such execution, cause the one or more computers to perform operations comprising:

obtaining first audio data generated by a first microphone, the first audio data representing sound within an area near a door of a property;

obtaining second audio data generated by a second microphone, the second audio data representing the sound within the area near the door of the property;

evaluating one or more characteristics of the first audio data;

evaluating a time delay between the first audio data and the second audio data;

based on evaluating the one or more characteristics of the first audio data, and based on determining that the time delay between the first audio data and the second audio data satisfies criteria for a knock event, determining that the first audio data corresponds to a knock event at the door; and in response to determining that the first audio data corresponds to a knock event at the door, performing a monitoring system action.

22. The non-transitory computer-readable medium of claim 21, wherein determining that the time delay between the first audio data and the second audio data satisfies criteria for a knock event comprises determining that the time delay is between a minimum time delay and a maximum time delay.

23. A monitoring system for monitoring a property, the monitoring system comprising:

a microphone that is configured to detect sound within an area near a door of the property and generate audio data that represents the sound; and a monitor control unit configured to:

obtain the audio data generated by the microphone;

evaluate one or more characteristics of the audio data;

determine that a first characteristic of the audio data satisfies criteria for a knock event;

in response to determining that the first characteristic of the audio data satisfies criteria for a knock event, evaluate a second characteristic of the audio data;

determine that the second characteristic of the audio data satisfies criteria for a knock event;

in response to determining that the second characteristic of the audio data satisfies criteria for a knock event, determine that the audio data corresponds to a knock event at the door; and in response to determining that the audio data corresponds to a knock event at the door, perform a monitoring system action.

24. The monitoring system of claim 23, wherein:

the first characteristic of the audio data comprises an amplitude of the audio data; and the second characteristic of the audio data comprises one of a peak frequency, a time duration, a period, or a directionality of the audio data.

25. The monitoring system of claim 23, wherein determining that the audio data corresponds to a knock event at the door comprises:
in response to determining that the second characteristic of the audio data satisfies criteria for a knock event, evaluating a third characteristic of the audio data;
determining that the third characteristic satisfies criteria for a knock event; and
in response to determining that the third characteristic of the audio data satisfies criteria for a knock event, determining that the audio data corresponds to a knock event at the door.

26. The monitoring system of claim 25, wherein:
the first characteristic of the audio data comprises an amplitude of the audio data;
the second characteristic comprises a peak frequency of the audio data; and
the third characteristic comprises one of a time duration, a period, or a directionality of the audio data.

27. A method for monitoring a property, the method comprising:
obtaining audio data generated by a microphone, the audio data representing sound within an area near a door of a property;
evaluating one or more characteristics of the audio data;
determining that a first characteristic of the audio data satisfies criteria for a knock event;
in response to determining that the first characteristic of the audio data satisfies criteria for a knock event, evaluating a second characteristic of the audio data;
determining that the second characteristic of the audio data satisfies criteria for a knock event;
in response to determining that the second characteristic of the audio data satisfies criteria for a knock event, determining that the audio data corresponds to a knock event at the door; and
in response to determining that the audio data corresponds to a knock event at the door, performing a monitoring system action.

28. The method of claim 27, wherein:
the first characteristic of the audio data comprises an amplitude of the audio data; and
the second characteristic of the audio data comprises one of a peak frequency, a time duration, a period, or a directionality of the audio data.

29. The method of claim 27, wherein determining that the audio data corresponds to a knock event at the door comprises:
in response to determining that the second characteristic of the audio data satisfies criteria for a knock event, evaluating a third characteristic of the audio data;
determining that the third characteristic satisfies criteria for a knock event; and
in response to determining that the third characteristic of the audio data satisfies criteria for a knock event, determining that the audio data corresponds to a knock event at the door.

30. The method of claim 29, wherein:
the first characteristic of the audio data comprises an amplitude of the audio data;
the second characteristic comprises a peak frequency of the audio data; and
the third characteristic comprises one of a time duration, a period, or a directionality of the audio data.

31. A non-transitory computer-readable medium storing software comprising instructions executable by one or more computers which, upon such execution, cause the one or more computers to perform operations comprising:
obtaining audio data generated by a microphone, the audio data representing sound within an area near a door of a property;
evaluating one or more characteristics of the audio data;
determining that a first characteristic of the audio data satisfies criteria for a knock event;
in response to determining that the first characteristic of the audio data satisfies criteria for a knock event, evaluating a second characteristic of the audio data;
determining that the second characteristic of the audio data satisfies criteria for a knock event;
in response to determining that the second characteristic of the audio data satisfies criteria for a knock event, determining that the audio data corresponds to a knock event at the door; and
in response to determining that the audio data corresponds to a knock event at the door, performing a monitoring system action.

32. The non-transitory computer-readable medium of claim 31, wherein:
the first characteristic of the audio data comprises an amplitude of the audio data; and
the second characteristic of the audio data comprises one of a peak frequency, a time duration, a period, or a directionality of the audio data.

33. The non-transitory computer-readable medium of claim 31, wherein determining that the audio data corresponds to a knock event at the door comprises:
in response to determining that the second characteristic of the audio data satisfies criteria for a knock event, evaluating a third characteristic of the audio data;
determining that the third characteristic satisfies criteria for a knock event; and
in response to determining that the third characteristic of the audio data satisfies criteria for a knock event, determining that the audio data corresponds to a knock event at the door.

34. The non-transitory computer-readable medium of claim 33, wherein:
the first characteristic of the audio data comprises an amplitude of the audio data;
the second characteristic comprises a peak frequency of the audio data; and
the third characteristic comprises one of a time duration, a period, or a directionality of the audio data.

* * * * *